(12) United States Patent
Matsumoto et al.

(10) Patent No.: US 8,295,221 B2
(45) Date of Patent: Oct. 23, 2012

(54) WIRELESS COMMUNICATION APPARATUS AND WIRELESS COMMUNICATION METHOD

(75) Inventors: Atsushi Matsumoto, Ishikawa (JP); Ayako Horiuchi, Kanagawa (JP); Daichi Imamura, Kanagawa (JP); Seigo Nakao, Kanagawa (JP)

(73) Assignee: Panasonic Corporation, Osaka (JP)

( * ) Notice: Subject to any disclaimer, the term of this patent is extended or adjusted under 35 U.S.C. 154(b) by 255 days.

(21) Appl. No.: 12/744,775

(22) PCT Filed: Nov. 17, 2008

(86) PCT No.: PCT/JP2008/003351
§ 371 (c)(1),
(2), (4) Date: May 26, 2010

(87) PCT Pub. No.: WO2009/069262
PCT Pub. Date: Jun. 4, 2009

(65) Prior Publication Data
US 2010/0302996 A1 Dec. 2, 2010

(30) Foreign Application Priority Data

Nov. 29, 2007 (JP) ................ 2007-309020

(51) Int. Cl.
*H04B 7/14* (2006.01)
(52) U.S. Cl. ...................................... 370/315
(58) Field of Classification Search .......... 370/203, 370/204–215, 216–228, 229–240, 241–253, 370/254–271, 310–337, 338–350, 351–394, 370/395.1, 395.3, 395.4, 395.41, 395.42, 370/395.5, 395.52, 395.53, 412–421, 431–457, 370/458–463, 464–497, 498–529
See application file for complete search history.

(56) References Cited

U.S. PATENT DOCUMENTS 5,596,439 A 1/1997 Dankberg et al.
(Continued)

FOREIGN PATENT DOCUMENTS

JP 11-510344 A 9/1999
(Continued)

OTHER PUBLICATIONS

Katti et al; "XORs in The Air: Practical Wireless Network Coding", Proc. of ACM SIGCOMM '06, Sep. 2006, pp. 1-12.
(Continued)

*Primary Examiner* — Kwang B Yao
*Assistant Examiner* — Jung-Jen Liu
(74) *Attorney, Agent, or Firm* — Pearne & Gordon LLP

(57) ABSTRACT

There are provided a wireless transmitting apparatus and a wireless transmission method that enable reduction of transmission delay of a system by enhancing receiving performance achieved during transmission of network-coded data. A decoding section 18 subjects a demodulated signal to error correction decoding and outputs the decoded signal to a buffer 17. The buffer 17 holds a data packet for a given period of time and outputs the packet to an encoding section 12. An encoding control section 11 controls an encoding rate for transmission data and outputs control information to the encoding section 12. In accordance with control information from the encoding control section 11, the encoding section 12 subjects a data packet to error correction encoding and outputs the coded data packet to a coding section 13. The coding section 13 subjects data sequences that pair up with each other to XOR processing and outputs a processing result to a modulation section 14. A wireless transmission section 15 subjects a modulated signal to transmission processing, such as digital-to-analogue conversion, up-conversion, and amplification, and transmits the signal subjected to transmission processing from an antenna 16 through wireless communication.

15 Claims, 37 Drawing Sheets

U.S. PATENT DOCUMENTS

| | | | |
|---|---|---|---|
| 6,061,820 A * | 5/2000 | Nakakita et al. | 714/751 |
| 6,421,387 B1 * | 7/2002 | Rhee | 375/240.27 |
| 6,985,072 B2 * | 1/2006 | Omidi et al. | 370/203 |
| 7,509,562 B1 * | 3/2009 | Esposito et al. | 714/775 |
| 7,644,343 B2 * | 1/2010 | Gubbi et al. | 714/776 |
| 2003/0156012 A1 * | 8/2003 | Omidi et al. | 340/310.01 |
| 2007/0081603 A1 | 4/2007 | Jang et al. | |
| 2008/0168332 A1 * | 7/2008 | Palanki et al. | 714/776 |
| 2009/0268662 A1 * | 10/2009 | Larsson et al. | 370/328 |

FOREIGN PATENT DOCUMENTS

| | | |
|---|---|---|
| WO | 2006/071187 A2 | 7/2006 |
| WO | 2006/080464 A1 | 8/2006 |

OTHER PUBLICATIONS

International Search Report for PCT/JP2008/003351 dated Feb. 3, 2009.

* cited by examiner

EXAMPLE OF NETWORK-CODING WHEN DIFFERENCE EXISTS BETWEEN AMOUNTS OF DATA

FIGURE FOR DESCRIBING RELATED-ART TECHNIQUE

ADD HEADER INFORMATION

SIGNALING OF CONTROL INFORMATION

REPEATER EMPLOYED WHEN HEADER INFORMATION IS ADDED OF FIRST EMBODIMENT

REPEATER EMPLOYED WHEN CONTROL INFORMATION IS TRANSMITTED OF FIRST EMBODIMENT

WIRELESS REPEATER OF SECOND EMBODIMENT

SPECIFICS OF PACKET CONFIGURATION

EXAMPLE IN WHICH FREE RESOURCE IS ARRANGED AT REARMOST POSITION

TRANSMISSION MODEL OF FOURTH EMBODIMENT

EXAMPLE OF SIGNALING USING ACK/NACK SIGNAL

REPEATER EMPLOYED WHEN ACK/NACK SIGNAL IS RELAYED OF FOURTH EMBODIMENT

REPEATER EMPLOYED WHEN HEADER INFORMATION IS ADDED OF FOURTH EMBODIMENT

REPEATER EMPLOYED WHEN CONTROL INFORMATION IS TRANSMITTED OF FOURTH EMBODIMENT

EXAMPLE IN WHICH FREE RESOURCE PRODUCED BY PACKET ERROR IS TAKEN AS ERRONEOUS POSITION OF PACKET AND IN WHICH FREE RESOURCE PRODUCED BY DIFFERENCE BETWEEN AMOUNTS OF DATA IS ARRANGED AT REARMOST POSITION

EXAMPLE IN WHICH BOTH FREE RESOURCES ARE ARRANGED CONTINUOUSLY TO REARMOST POSITION

CASE WHERE ERROR HAS ARISEN IN DOWNLINK PACKET though it has been subjected to the robust processing in the first signal.

WIRELESS COMMUNICATION APPARATUS AND WIRELESS COMMUNICATION METHOD

TECHNICAL FIELD

The present invention relates to a wireless communication system and a wireless communication method for performing a receipt of a first signal from a first wireless communication apparatus, a receipt of a second signal from a second wireless communication apparatus, and a transmission of a third signal to the first wireless communication apparatus and the second wireless communication apparatus.

BACKGROUND ART

In relation to a wireless communication system, an application of network-coding to a wireless repeater (RS: Repeater Station, hereinafter abbreviated as "RS") has hitherto been discussed.

An RS has a function of relaying data transmitted from a mobile station (MS: Mobile Station, hereinafter abbreviated as an "MS") to a base station (BS: Base Station, hereinafter abbreviated as a "BS") and relaying data received by the BS to the MS. Meanwhile, network-coding is a technique for enabling a performance of efficient relaying by subjecting relay data to coding at a relay node.

FIG. 1 shows an example application of network-coding to an RS. An example application of network-coding to an RS is specifically described by use of FIG. 1. In FIG. 1, reference symbol RS is assumed to relay data S1 transmitted from an MS to a BS or relay data S2 transmitted from the BS to the MS. After the RS conducts a relaying operation by subjecting the data S1 and S2 to network-coding and simultaneously transmitting the data S1 and S2 to the MS and the BS by the same channel (the same resource).

Network-coding effected by the RS is now described. The RS subjects a bit sequence of the data S1 and a bit sequence of the data S2 to XOR (Exclusive OR) operation. In the example shown in FIG. 1, since S1="1111" and S2="1010" are achieved, an XOR result comes to "0101." The XOR result "0101" is simultaneously transmitted to the MS and the BS.

Receiving operation of the MS and the BS is now described. The MS performs XOR operation between the XOR result "0101" transmitted from the RS and the data S1 "1111" transmitted by the MS, whereby extraction of the data S2 "1010" transmitted from the BS becomes possible. Likewise, the BS performs XOR operation between the XOR result "0101" transmitted from the RS and the data S2 "1010" transmitted from the BS, whereby extraction of the data S1 "1111" transmitted from the MS becomes possible.

FIG. 2 is a descriptive view of network-coding to which a plurality of packets are to be subjected. After received the plurality of packets (S1 to S6) from the MS and the BS, the RS broadcasts the packets by one operation through use of network-coding. A resource used for network-coding is determined by amounts of data from the MS and the BS and channel quality.

FIG. 3 shows example network-coding performed when the amount of data varies from one destination (an MS or a BS) to another destination. As shown in FIG. 3, when data to be transmitted to the MS and the BS differ from each other in terms of an amount, the RS subjects data to network-coding after matching a smaller data size to a larger data size. A conceivable method for matching a data size is, for instance, 0-padding.

FIG. 4 is a view for describing another related art technique. When failed to receive a data packet from the MS or the BS, the RS solely performs transmission by use of a resource for network-coding without performance of network-coding (e.g., see Patent Document 1).

Patent Document 1: US2007/0081603A

DISCLOSURE OF THE INVENTION

Problem that the Invention is to Solve

A drawback in the related-art technique lies in that occurrence of an error in network-coded data results in an increase in transmission delay. After buffered the plurality of packets that differ from each other in terms of transmission timing, the RS subjects the packets to network-coding and transmits the thus-network-coded data. Therefore, a period during which data are held in a buffer comes, as it is, to a transmission delay. When an error arises in data transmitted by means of network-coding, an additional delay adds to transmission delay.

FIG. 5 is a view showing a point of view of the present invention. As mentioned previously, an amount of resource that enables transmission of the maximum amount of data is consumed by network-coding (a total amount of data S2, S4, and S6 provided in a lower portion of FIG. 5). Specifically, as shown in FIG. 5, a difference between the total amount of data S2, S4, and S6 and a total amount of data S1, S3, and S5 corresponds to an amount of free resource. The present invention has been conceived by paying attention to the free resource.

An object of the present invention is to increase a receiving characteristic achieved during network-coding by effective utilization of a free resource for network-coding when links; for instance, an uplink and a downlink, differ from each other in terms of an amount of data. The present invention aims at providing a wireless communication apparatus and a wireless communication method that enable a decrease in transmission delay of a system by enhancing receiving performance achieved during transmission of network-coded data.

Means for Solving the Problem

A wireless communication apparatus of the present invention is a wireless communication apparatus that receives a first signal from a first wireless communication apparatus and a second signal, which is greater than the first signal in an amount of data, from a second wireless communication apparatus and that transmits a third signal, which has the same amount of data of the second signal, to the first wireless communication apparatus and the second wireless communication apparatus, the wireless communication apparatus comprising:

an encoding section that generates a redundant packet by subjecting a predetermined packet included in the first signal to robust processing; and a coding section that generates the third signal by combining a signal, which is generated by adding the redundant packet to the first signal, with the second signal in a separable manner.

By means of the configuration, the third signal is transmitted while including the redundant packet generated by subjecting the predetermined packet included in the first signal to the robust processing. As a result, a resource commensurate with a difference between the amount of data in the second signal and the amount of data in the first signal is effectively utilized, to thus make it possible to subject a packet which will probably cause a delay in excess of the maximum delay time to the robust processing and transmit the thus-processed signal. Therefore, a receiving characteristic of the packet is enhanced, and a mean delay of a system can be diminished.

In the wireless communication apparatus of the present invention, the encoding section generates the redundant packet by reducing an encoding rate of a packet that is included in the first signal and that has previously been transmitted from the first wireless communication apparatus.

By means of the configuration, a packet which will probably cause a delay in excess of the maximum delay time is coded in such a way that error correction performance is enhanced. Hence, a receiving characteristic of the packet is enhanced, and a mean delay of the system can be reduced.

The wireless communication apparatus of the present invention further includes a data identification section that identifies a packet having an old sequence order in the first signal, wherein the encoding section generates the redundant packet by reducing an encoding rate of the packet having the old sequence order included in the first signal.

By means of the configuration, a packet which will probably cause a delay in excess of the maximum delay time is coded in such a way that error correction performance is enhanced. Hence, a receiving characteristic of the packet is enhanced, and a mean delay of the system can be reduced.

The wireless communication apparatus of the present invention further includes a data identification section that identifies a packet having a preceding redundancy version in the first signal, wherein the encoding section generates the redundant packet by reducing an encoding rate of the packet that is included in the first signal and that has the preceding redundancy version.

By means of the configuration, a packet which will probably cause a delay in excess of the maximum delay time is coded in such a way that error correction performance is enhanced. Hence, a receiving characteristic of the packet is enhanced, and a mean delay of the system can be reduced.

In the wireless communication apparatus of the present invention, the encoding section generates a plurality of redundant packets by subjecting a plurality of packets included in the first signal to the robust processing in accordance with a degree of influence on the transmission delay, and the coding section generates the third signal by combining a signal, which is generated by adding the plurality of redundant packets to the first signal, with the second signal in a separable manner.

According to the configuration, a plurality of packets are subjected to robust processing, whereby receiving characteristics of the respective packets are enhanced, so that a mean delay of the system can further be reduced.

The wireless communication apparatus of the present invention further includes an error determination section that determines an error in a packet included in the first signal, wherein the encoding section arranges the redundant packet in a free resource produced by the error in transmission of the packet.

The configuration makes it possible to perform robust processing using a larger number of free resources; hence, a receiving characteristic of the packet is enhanced, so that a mean delay of the system can be reduced.

In the wireless communication apparatus of the present invention, the encoding section generates the redundant packet by reducing an encoding rate of a packet that is retransmitted a large number of times.

The configuration makes it possible to subject a packet which will undergo retransmission, to thus cause a delay in excess of the maximum delay time, to robust processing. Therefore, a receiving characteristic of the packet is enhanced, so that a mean delay of the system can be reduced.

In the wireless communication apparatus of the present invention, the encoding section generates a plurality of redundant packets by subjecting a plurality of packets included in the first signal to the robust processing in accordance with a degree of influence on a transmission delay, and the coding section arranges the plurality of redundant packets in free resources produced by the error in packet transmission.

According to the configuration, a free resource produced by the packet error is also utilized, whereby the plurality of packets can respectively be subjected to the robust processing using a greater number of free resources. Therefore, receiving characteristics of the respective packets are enhanced, so that a mean delay of the system can further be reduced.

A wireless communication method of the present invention is a wireless communication method for receiving a first signal from a first wireless communication apparatus and a second signal, which is greater than the first signal in an amount of data, from a second wireless communication apparatus and transmitting a third signal, which has the same amount of data of the second signal, to the first wireless communication apparatus and the second wireless communication apparatus, the method comprising:

an encoding step of generating a redundant packet by subjecting a predetermined packet included in the first signal to robust processing; and a coding step of generating the third signal by combining a signal, which is generated by adding the redundant packet to the first signal, with the second signal in a separable manner.

In the wireless communication method of the present invention, in the encoding step, the redundant packet is generated by reducing an encoding rate of a packet that is included in the first signal and that has previously been transmitted from the first wireless communication apparatus.

In the wireless communication method of the present invention, in the encoding step, the redundant packet is generated by reducing an encoding rate of the packet having an old sequence order included in the first signal.

In the wireless communication method of the present invention, in the encoding step, the redundant packet is generated by reducing an encoding rate of the packet that is included in the first signal and that has a preceding redundancy version.

In the wireless communication method of the present invention, in the encoding step, a plurality of redundant packets are generated by subjecting the plurality of packets included in the first signal to the robust processing in accordance with a degree of influence on the transmission delay; and in the coding step, the third signal is generated by combining a signal, which is generated by adding the plurality of redundant packets to the first signal, with the second signal in a separable manner.

In the wireless communication method of the present invention, in the encoding step, the redundant packet is arranged in a free resource produced by an error in transmission of the packet.

In the wireless communication method of the present invention, in the encoding step, the redundant packet is generated by reducing an encoding rate of a packet that is retransmitted a large number of times.

In the wireless communication method of the present invention, in the encoding step, a plurality of redundant packets are generated by subjecting a plurality of packets included in the first signal to the robust processing in accordance with a degree of influence on a transmission delay; and in the coding step, the plurality of redundant packets are arranged in free resources produced by the error in packet transmission.

ADVANTAGE OF THE INVENTION

According to the wireless communication apparatus and the wireless communication method of the present invention, a predetermined packet included in a signal received from a mobile station is subjected to robust processing, to thus generate a redundant packet. A signal generated by adding the redundant packet to the signal received from the mobile station and the signal received from a base station are combined together in a separable manner, and the thus-combined signals are transmitted to the mobile station and the base station. Accordingly, when a difference exists between an amount of uplink data and an amount of downlink data, a free resource for network-coding purpose is effectively utilized, so that receiving performance achieved during transmission of network-coded data is enhanced, so that transmission delay of a system can be diminished.

DESCRIPTIONS OF THE REFERENCE NUMERALS AND SYMBOLS

- 11 ENCODING CONTROL SECTION
- 12 ENCODING SECTION
- 13 CODING SECTION
- 14 MODULATION SECTION WIRELESS TRANSMISSION SECTION
- 16 ANTENNA
- 17 BUFFER
- 18 DECODING SECTION
- 19 DEMODULATION SECTION
- 20 WIRELESS RECEIVING SECTION
- 21 CONTROL INFORMATION ADDITION SECTION
- 22 DATA IDENTIFICATION SECTION
- 25 ERROR DETERMINATION SECTION

BEST MODES FOR IMPLEMENTING THE INVENTION

Embodiments of the present invention are hereinbelow described by reference to the drawings.

First Embodiment

A first embodiment provides descriptions about an example in which packets that will affect a transmission delay of a system (a resultantly-affected delay may exceed the maximum delay time) are preferentially subjected to robust processing by use of a free resource for network-coding purpose, to thus be subjected to network-coding. Packets that will affect a transmission delay of a system herein designate packets generated and transmitted in advance. A method for decreasing an encoding rate of error correction coding is used as a robust processing method.

By means of the configuration, a packet that will probably exceed the maximum delay time is preferentially subjected to robust processing, to thus undergo network-coding. Therefore, a receiving characteristic of the packet is enhanced, so that a mean delay of the system can be reduced.

(Wireless Repeater of the First Embodiment)

Figure 1:
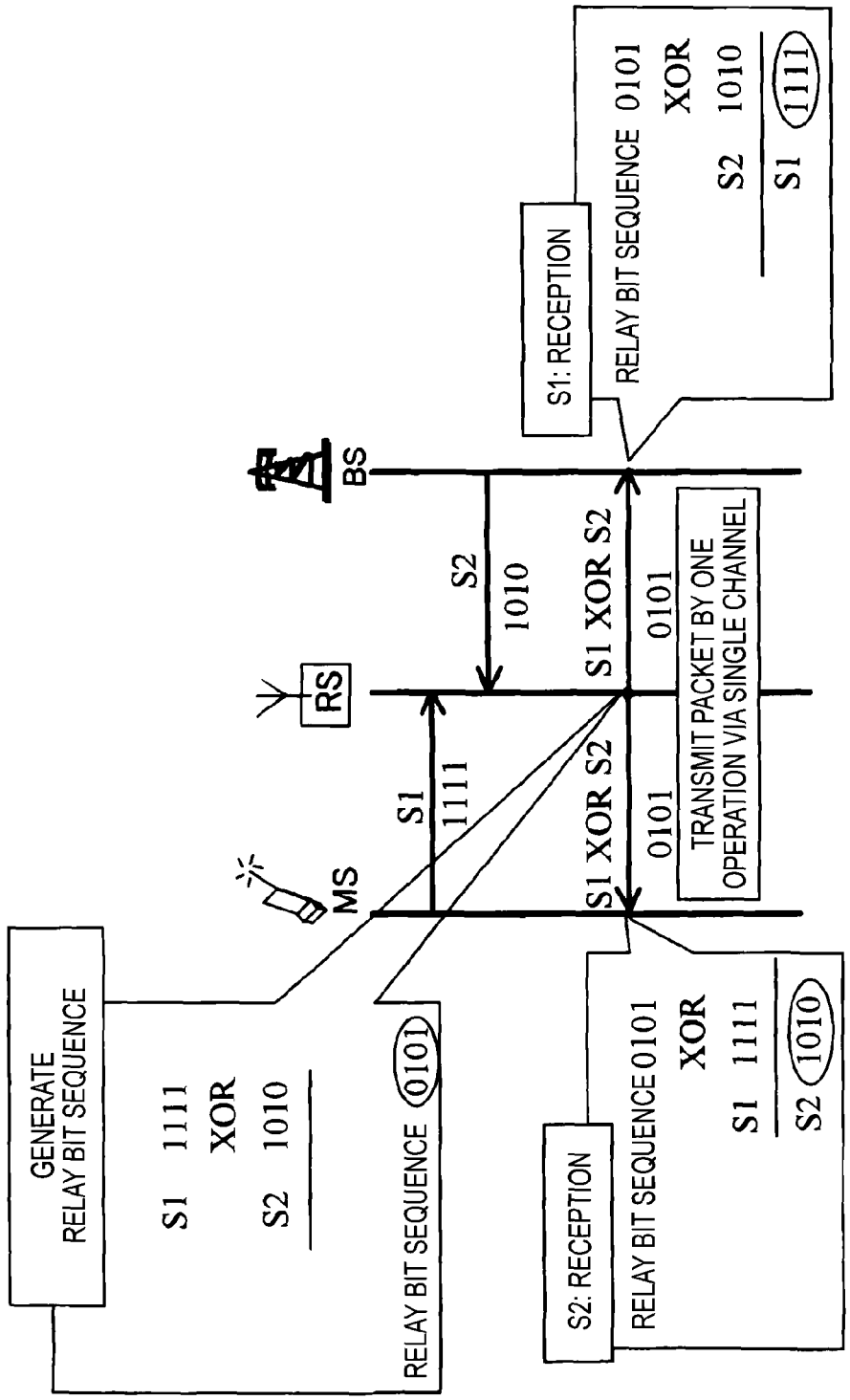
FIG. 1 It is a view showing an example application of network-coding to a wireless repeater.
Figure 2:
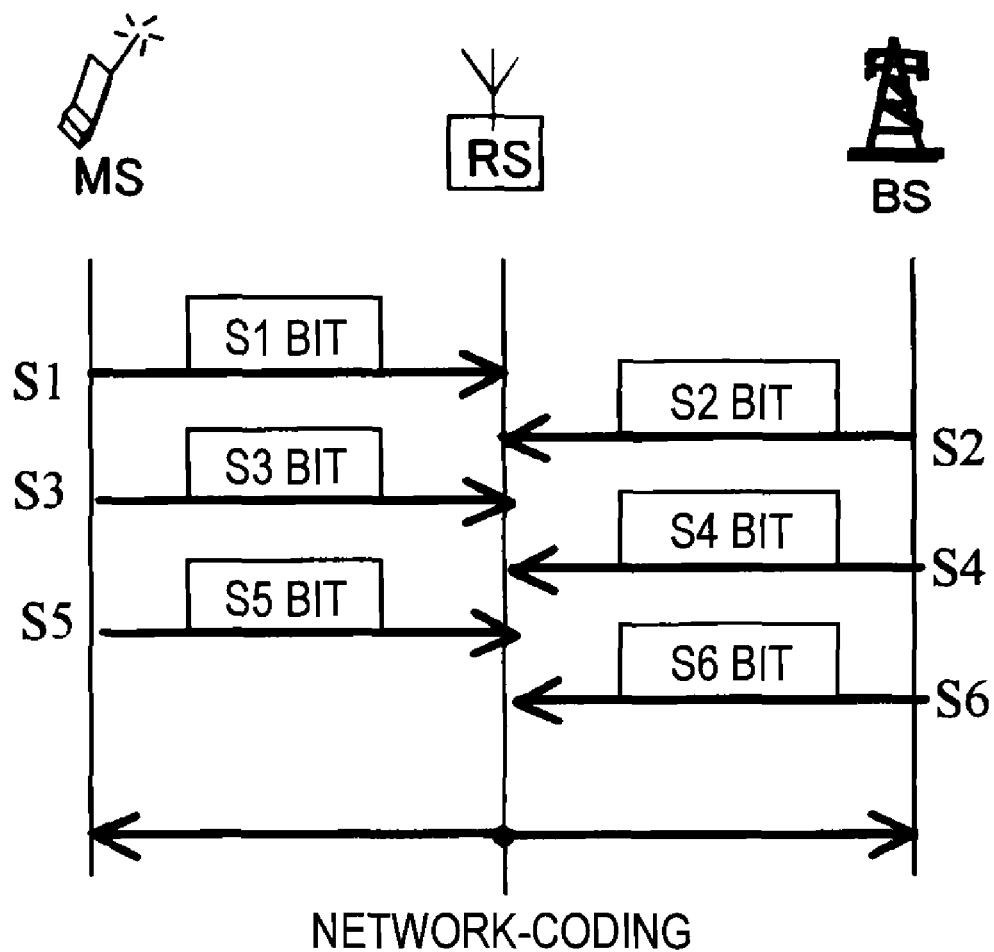
FIG. 2 It is a descriptive view of network-coding for a plurality of packets.
Figure 3:
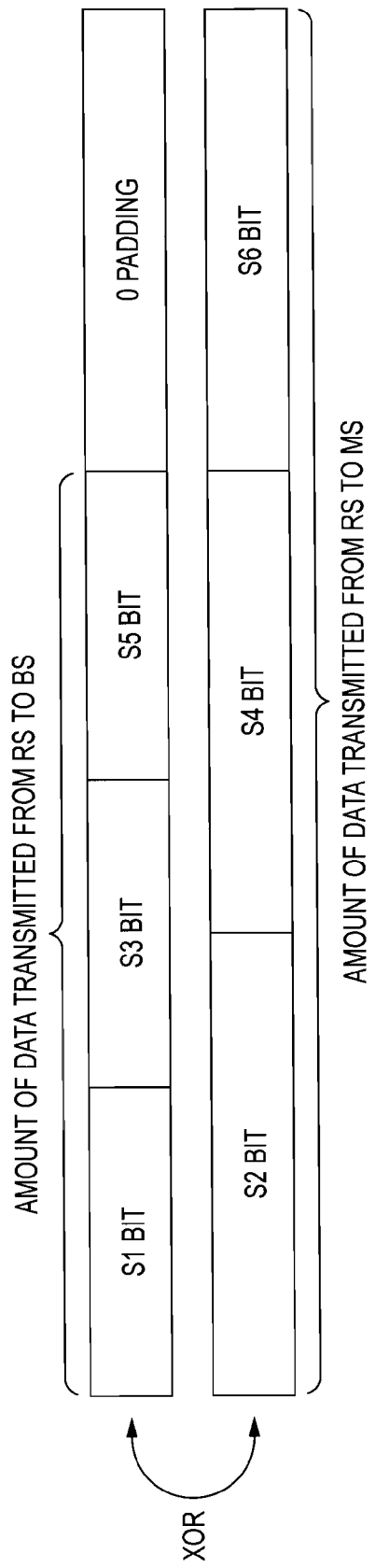
FIG. 3 It is a view of example network-coding performed when a difference exits in amounts of data.
Figure 4:
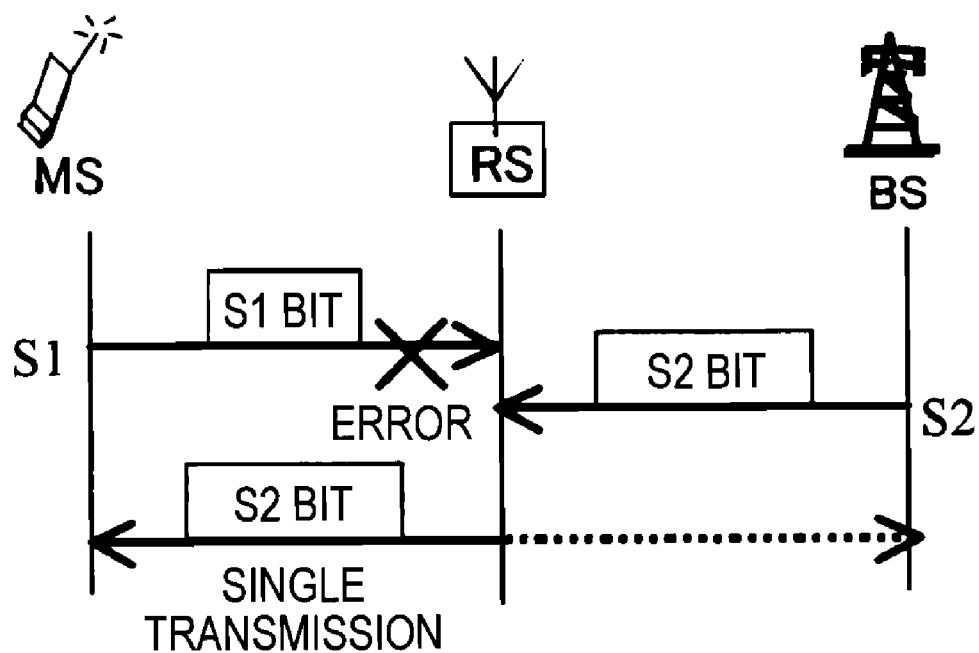
FIG. 4 It is a view for describing the related art.
Figure 5:
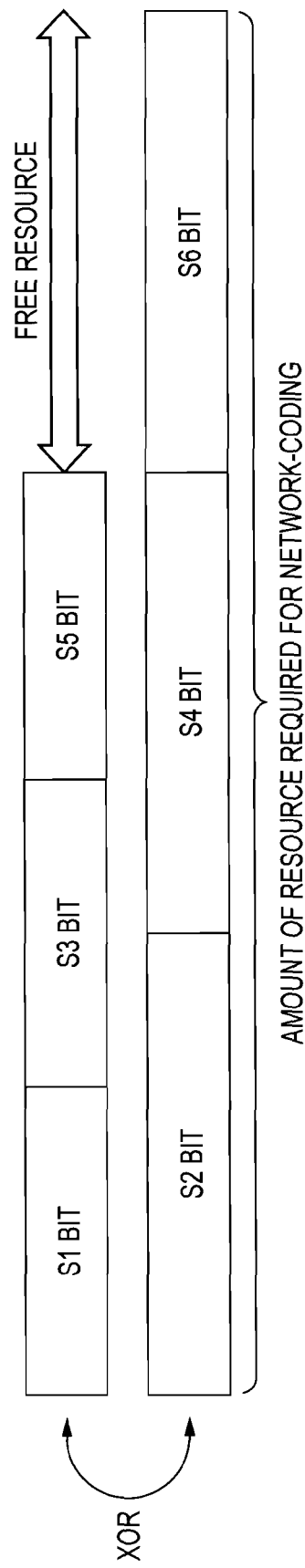
FIG. 5 It is a view showing a point of view of the present invention.
Figure 6:
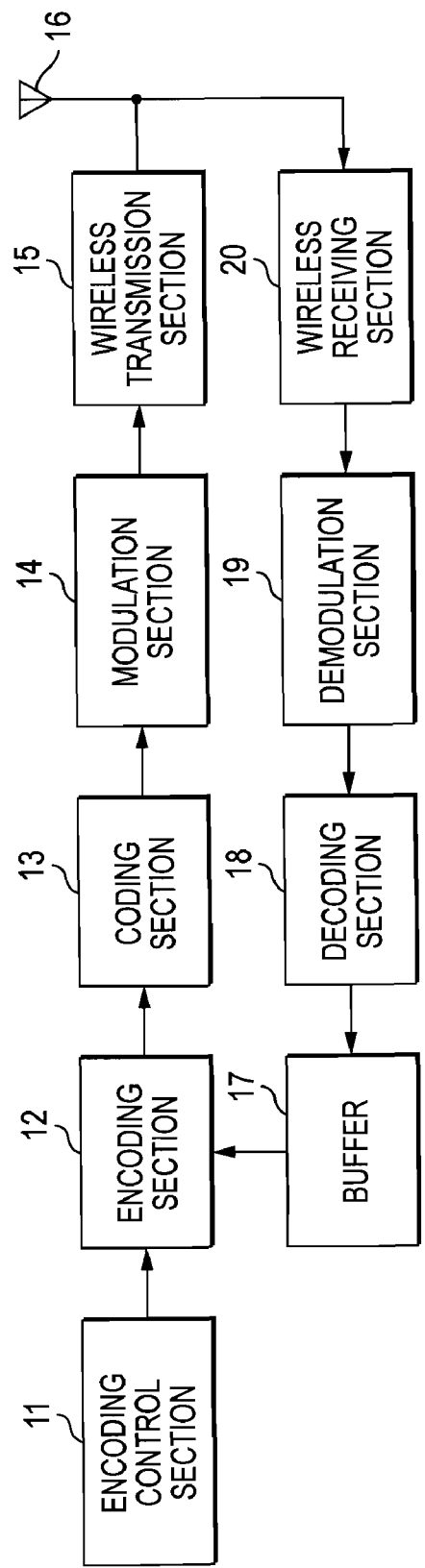
FIG. 6 It is a block diagram of a wireless repeater of a first embodiment of the present invention.

FIG. 6 shows a block diagram of a wireless repeater of the first embodiment. The wireless repeater (RS) of the first embodiment shown in FIG. 6 includes an antenna 16, a wireless receiving section 20, a demodulation section 19, a decoding section 18, a buffer 17, an encoding control section 11, an encoding section 12, a coding section 13, a modulation section 14, and a wireless transmission section 15.

A wireless receiving section 20 outputs to the demodulation section 19 a signal that is produced by subjecting the control signal, which has been received from the base station by way of the antenna 16, to receiving processing, such as down-conversion, analogue-to-digital conversion, and the like. The demodulation section 19 demodulates a received control signal and outputs a demodulated signal to the decoding section 18. The decoding section 18 subjects the demodulated signal to error correction decoding and outputs a decoded signal to the buffer 17. The buffer 17 holds a data packet for a given period of time and outputs the data packet to the encoding section 12. The encoding control section 11 controls an encoding rate for transmission data and outputs control information to the encoding section 12.

In accordance with the control information from the encoding control section 11, the encoding section 12 subjects the data packet to error encoding and outputs the thus-encoded data packet to the coding section 13. The coding section 13 subjects a pair of data sequences to XOR processing and outputs an XOR result to the modulation section 14. The modulation section 14 modulates an XOR-processed signal and outputs the signal to the wireless transmission section 15. The wireless transmission section 15 subjects the modulated signal output from the modulation section 14 to transmission processing, such as digital-to-analogue conversion, up-conversion, and amplification, and outputs the signal subjected to transmission processing from the antenna 16 by means of wireless communication.

(Operation of the First Embodiment)

Figure 7:
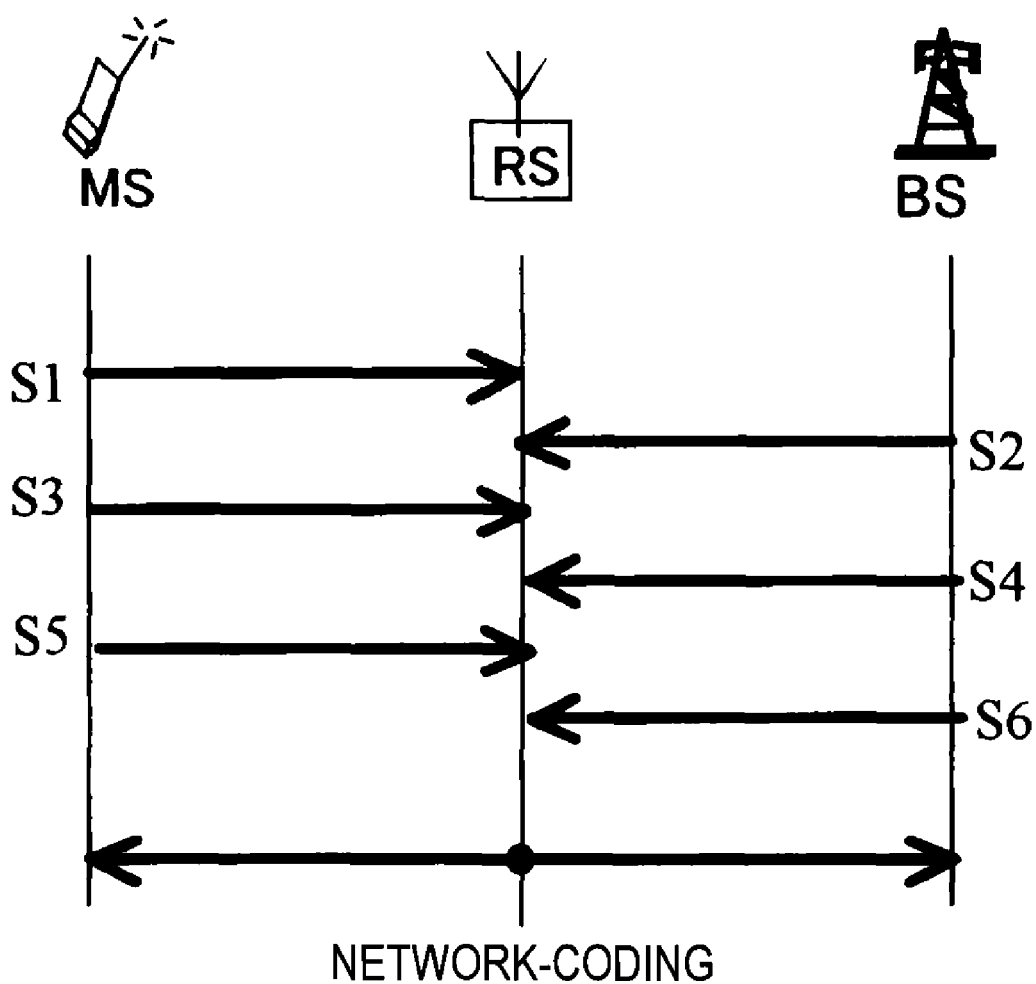
FIG. 7 It is a view showing a transmission model of the first embodiment of the present invention.

FIG. 7 is a transmission model of the first embodiment. Operation of the first embodiment is described. An RS relays a packet from a BS to an MS (along a downlink) and a packet from an MS to a BS (along an uplink), respectively. The RS receives a plurality of data packets (S1, S3, S5 and S2, S4, S6) respectively along the downlink and the uplink; collectively subjects the packets to network-coding; and simultaneously relays the data packets to the MS and the BS by means of a single channel (a single resource).

Figure 8:
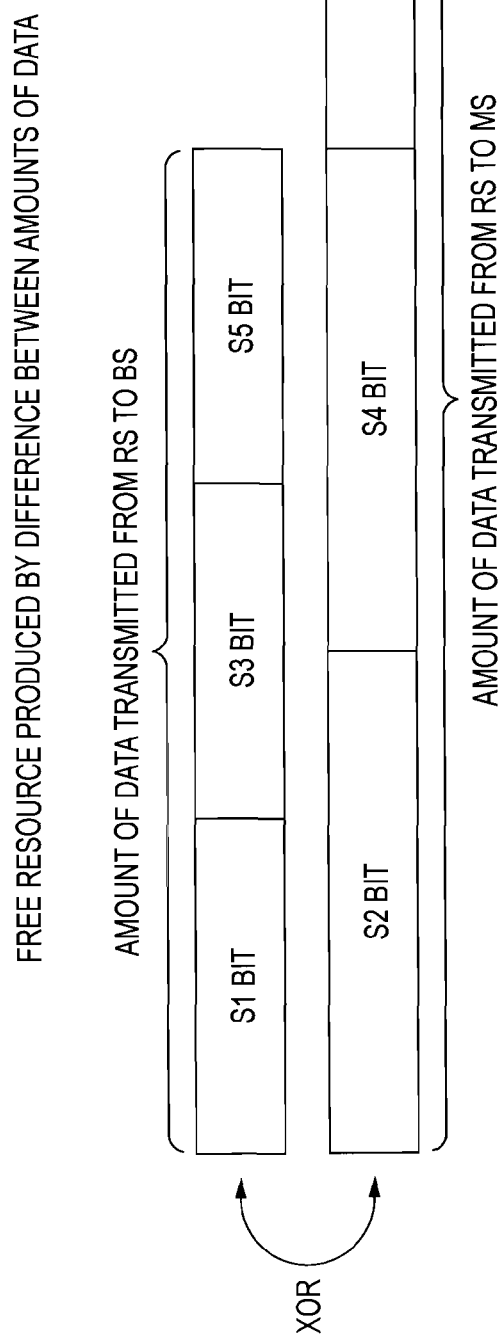
FIG. 8 It is a descriptive view of a free resource stemming from a difference in amounts of data, in the first embodiment of the present invention.

FIG. 8 is a descriptive view of a free resource stemming from a difference between amounts of data. When an amount of downlink data and an amount of uplink data are compared with each other, the amount of downlink data is assumed to be greater than the amount of uplink data; namely, the downlink data is assumed to be greater than the uplink data in terms of a packet size. Therefore, a difference arises between the uplink data buffered in the RS and the downlink data buffered in the RS in terms an amount of data. The difference; namely, a difference between the total amount of data S2, S4, and S6 and the total amount of data S1, S3, and S5 is called a free resource.

In the first embodiment, network-coding utilizing a free resource shown in FIG. 8 is carried out. Specifically, network-coding requires assurance of a resource required to transmit the maximum amount of data by one operation. The smaller amount of data is matched with the greater amount of data.

In the embodiment, the amount of uplink data is smaller than the amount of downlink data. When matching the amount of uplink data to the amount of downlink data, the RS operates so as to make a specific packet robust. The encoding control section 11 controls robust processing. The encoding control section 11 performs control operation for preferentially subjecting packets that will affect a transmission delay of a system (a resultantly-affected delay will exceed the maximum delay) to robust processing. Specific descriptions are provided below.

A transmission sequence of uplink packets is determined as S1, S3, and S5. In this case, the data S1 cause the largest delay time at a point in time when the RS performs relay operation. Therefore, the encoding control section 11 performs control operation so as to subject the data S1 to robust processing. Processing for setting an encoding rate of error correction so as to become smaller than that for another packet is performed as a robust processing method.

Figure 9:
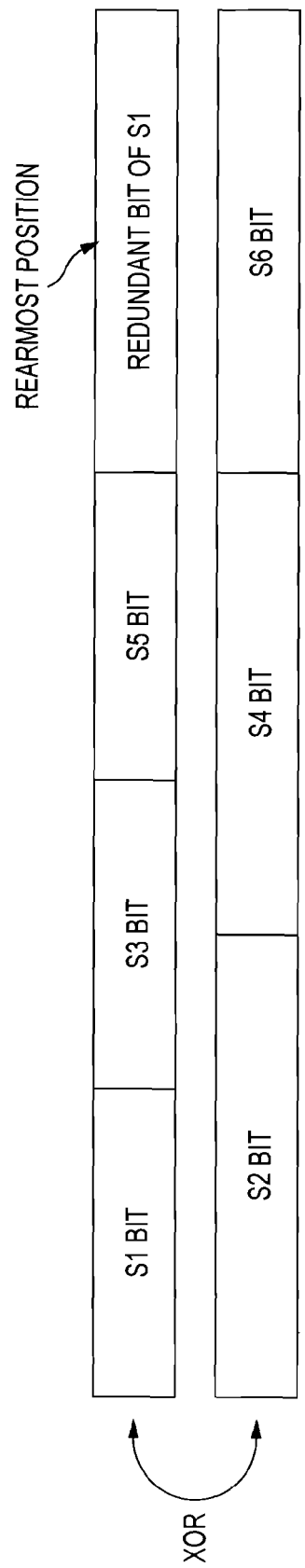
FIG. 9 It is a descriptive view of a case where data S1 are subjected to robust processing (a reduction in encoding rate) and where the rearmost part of the processed data is subsequently used as a free resource in the first embodiment of the present invention.

FIG. 9 is a descriptive view of a case where the data S1 are subjected to robust processing (a reduction in encoding rate) and where the rearmost part of the packet is subsequently used as a free resource. As illustrated in the drawing, an increase in redundant bit stemming from a decrease in encoding rate is assigned to a free resource. A conceivable method for determining a delay time arising among a plurality of packets is based on a sequence in which a packet is input to a buffer.

Operation for enabling the MS and the BS to decode the data relayed by the RS by means of network-coding is now described in connection with a case where signaling is not used and a case where signaling is used.

(Operation Performed when Signaling is not Used)

There is described operation performed when signaling is not separately required when the MS and the BS decode the data subjected to network-coding by the RS.

A packet to be subjected to robust processing among the RS, the MS, and the BS and a robust processing method for the respective processing operations are previously set. In the embodiment, the data S1 are taken as a packet to be subjected to robust processing, and a method for decreasing an encoding rate of error correction is taken as a robust processing method. Hence, an encoding rate achieved after robust processing is previously set. Moreover, the position of the free resource is previously set.

Figure 10:
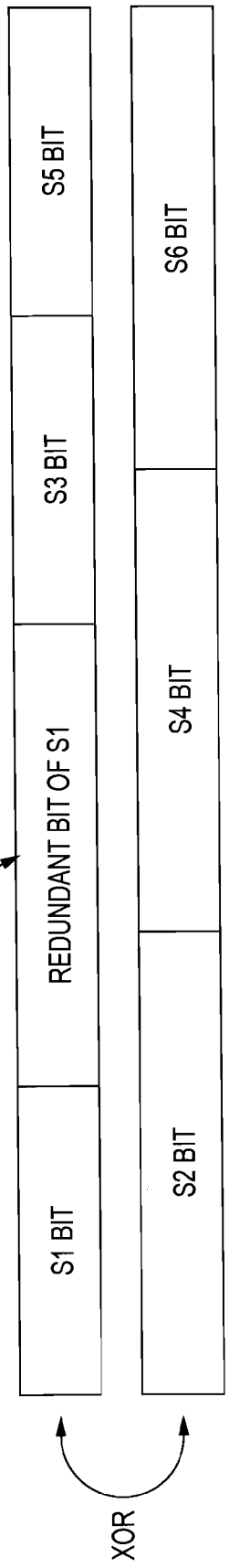
FIG. 10 It is a descriptive view of a case where data S1 is subjected to robust processing (a reduction in encoding rate) and where a position subsequent to S1 is then used as a free resource in the first embodiment of the present invention.

A considered position for the free resource is the rearmost end (FIG. 9) or a position continual to a packet to be subjected to robust processing. FIG. 10 is a descriptive view of a case where a position continual to the data S1 after the data S1 have undergone robust processing (a decrease in encoding rate) is used as a free resource. As mentioned above, information required when the MS and the BS perform decoding is previously set, and the RS performs robust processing in accordance with the information; subjects the data to network-coding; and transmits the network-coded data.

(Operation Performed when Signaling is Used)

There is described operation performed in a case where associated signaling is separately required when the MS and the BS decode the data subjected to network-coding by the RS.

The RS determines a packet to be subjected to robust processing, a robust processing method (an encoding rate subjected to robust processing), and the position of the free resource. The RS separately notifies the MS and the BS about the thus-determined information.

Figure 11:
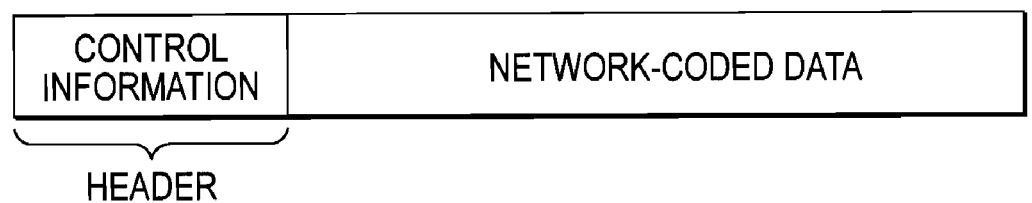
FIG. 11 It is a descriptive view for a case where header information is added to network-coded data, in the first embodiment of the present invention.
Figure 13:
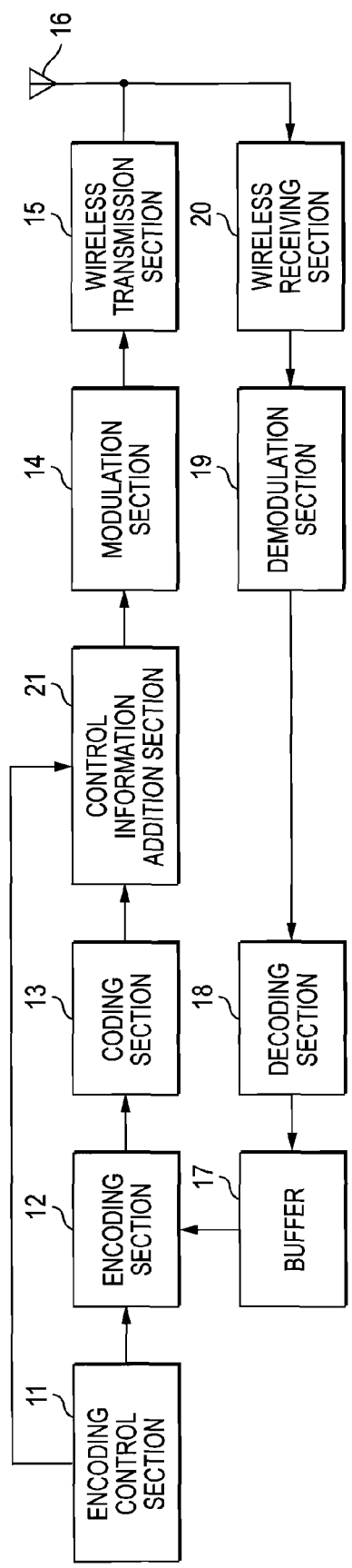
FIG. 13 It is a block diagram of a repeater used when header information is added to the network-coded data, in the first embodiment of the present invention.

The notification method is described. FIG. 11 is a descriptive view for a case where header information is added to the network-coded data. FIG. 13 is a block diagram of a repeater achieved when header information is added to the network-coded data. As shown in FIG. 13, the control information addition section 21 adds information output from the encoding control section 11, such as a packet to be subjected to robust processing, as header information to the network-coded data output from the coding section 13; and outputs the network-coded data with the header information to the modulation section 14. The header is not subjected to ordinary network-coding.

Figure 12:
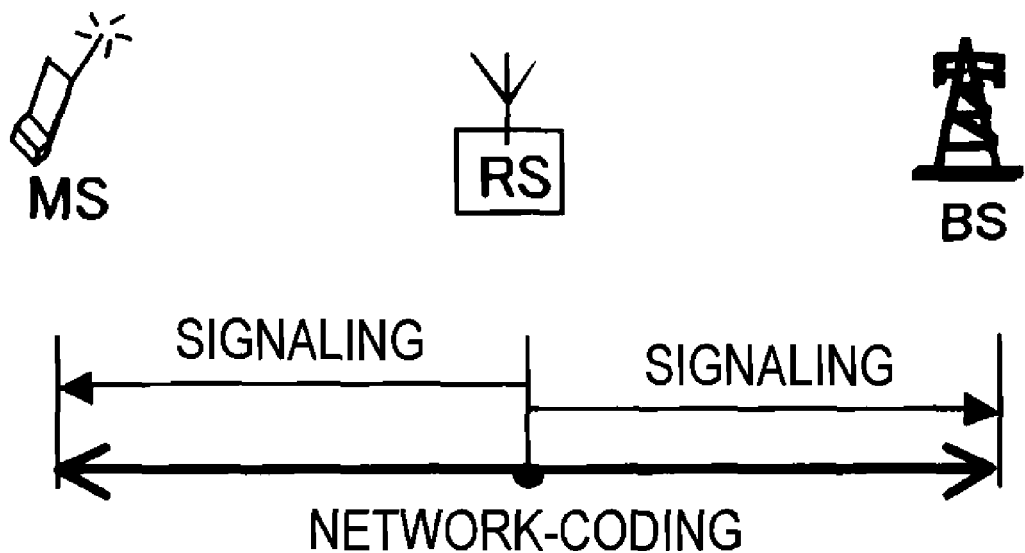
FIG. 12 It is a descriptive view of a case where control information is signaled by way of a private channel or a common channel aside from transmission of network-coded data, in the first embodiment of the present invention.
Figure 14:
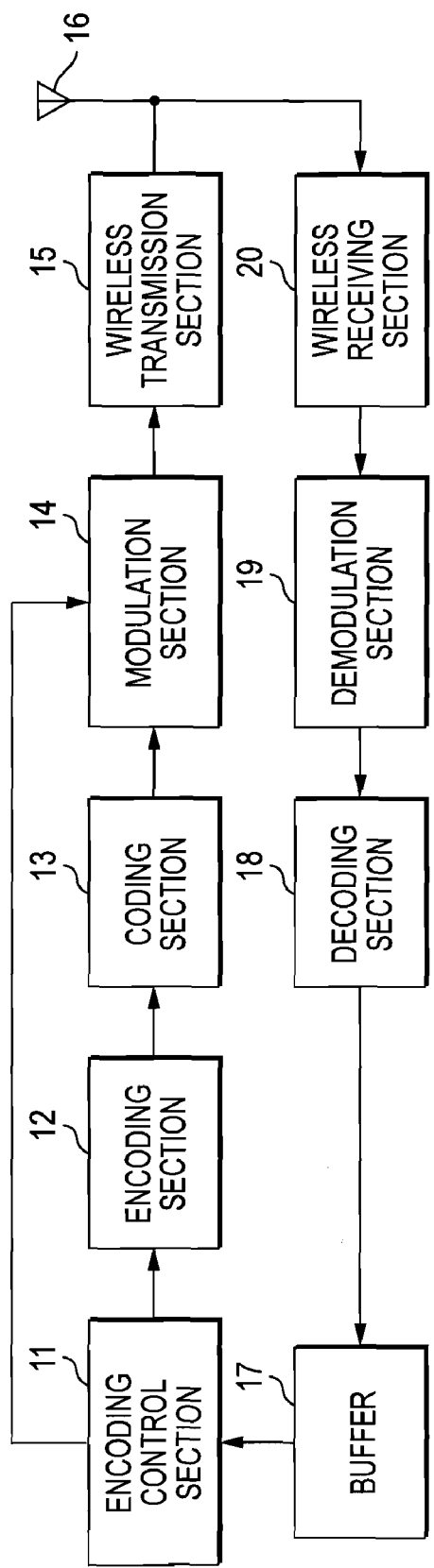
FIG. 14 It is a block diagram of the repeater for a case where control information is transmitted by way of the private channel or the common channel aside from transmission of network-coded data, in the first embodiment of the present invention.

FIG. 12 is a descriptive view showing a case where control information is subjected to signaling by way of a private channel or a common channel aside from transmission of network-coded data. FIG. 14 is a block diagram of a repeater achieved when control information is transmitted by way of a private channel or a common channel aside from transmission of network-coded data. As shown in FIG. 14, the control information output from the encoding control section 11 is modulated by the modulation section 14 and subjected to transmission processing by the wireless transmission section 15, to thus subsequently be output by way of the antenna 16 as shown in FIG. 12.

Second Embodiment

A second embodiment describes another example in which packets that will affect a transmission delay of the system (which will surpass the maximum delay time) are preferentially subjected to robust processing by use of the free resource, to thus undergo network-coding. A difference between the first and second embodiments lies in that a sequence order or a redundancy version (a redundancy version that is hereinafter called an RV) is used as a standard for determining a delay time.

Specifically, in the embodiment, a packet having an earlier sequence order or an older RV is preferentially subjected to robust processing. The sequence order means packet serial numbers that are added when data are divided at a high-order layer into packets. The RV is a parameter for changing HARQ parameters (a systematic bit priority parameter and a rate match parameter) every increase of the number of operations for transmitting an H-ARQ (Hybrid-Auto Repeat reQuest).

According to the configuration, a packet having a larger sequence order or a larger RV is preferentially subjected to robust processing, to thus be network-coded. Hence, a receiving characteristic of the packet is enhanced, and mean delay of the system can be diminished.

(Wireless Repeater of the Second Embodiment)

Figure 15:
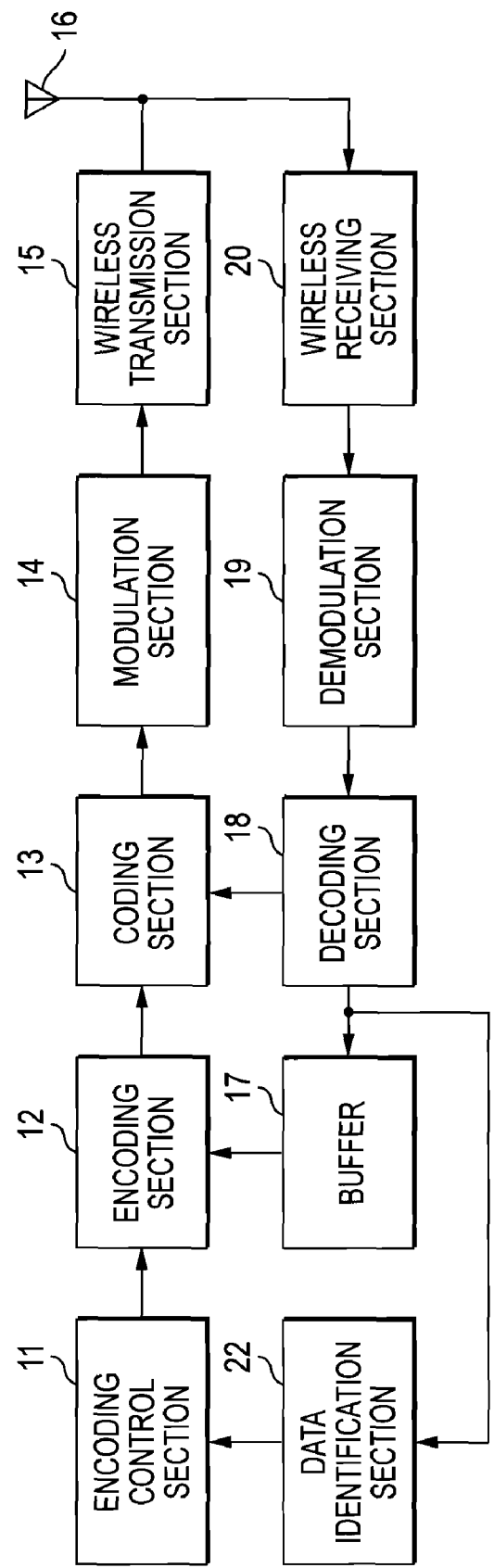
FIG. 15 It is a view showing a configuration of a wireless repeater of a second embodiment of the present invention.

FIG. 15 shows a wireless repeater of the second embodiment. Only a difference of structure between the first embodiment and the second embodiment is provided. In addition to having the configuration of the first embodiment, the wireless repeater of the second embodiment shown in FIG. 15 has a data identification section 22 (FIG. 6). The data identification section 22 identifies a sequence order of or RV information about a packet from the control information about the received packet output from the decoding section 18 and outputs the sequence order or the RV information to the encoding control section 11. The encoding control section 11 determines an encoding rate of the packet in accordance with the sequence order or the RV information output from the data identification section 22 and outputs the encoding rate to the encoding section 12.

(Operation of the Second Embodiment)

The second embodiment is identical with the first embodiment except that a sequence order or RV information is used as a standard for robust processing.

Figure 16:
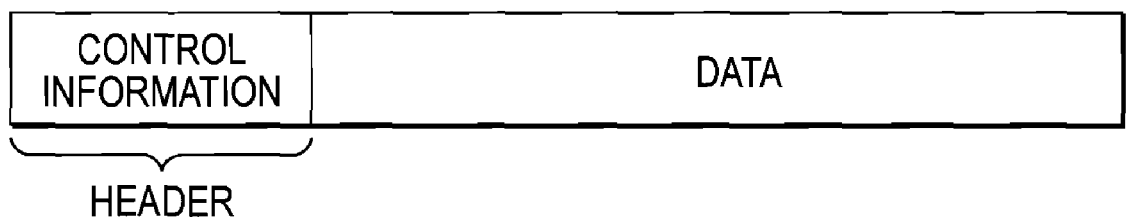
FIG. 16 It is a view showing a specific configuration of a packet in the second embodiment of the present invention.

The sequence order is herein described in detail. The sequence order is control information that shows an order in which packets are arranged before division of data and that is added to each of divided packets when data of a specified size or greater are transmitted while divided into a plurality of packets. FIG. 16 shows specifics of a packet configuration. The control information is generally transmitted while added as a header to a data portion.

In the second embodiment, the data identification section 22 identifies a sequence order from the control information included in the headers of received packets, and the encoding control section 11 preferentially subjects packets of an older sequence order to robust processing in accordance with identification information.

The second embodiment is analogous to the first embodiment even in terms of a packet to be subjected to robust processing, a robust processing method (an encoding rate achieved after robust processing), and a method for notifying information about the position of the free resource. Conceivable methods include a method for adding header information to network-coded data and a method for notifying header information as control information by way of a private channel or a common channel aside from transmission of network-coded data.

Figure 17:
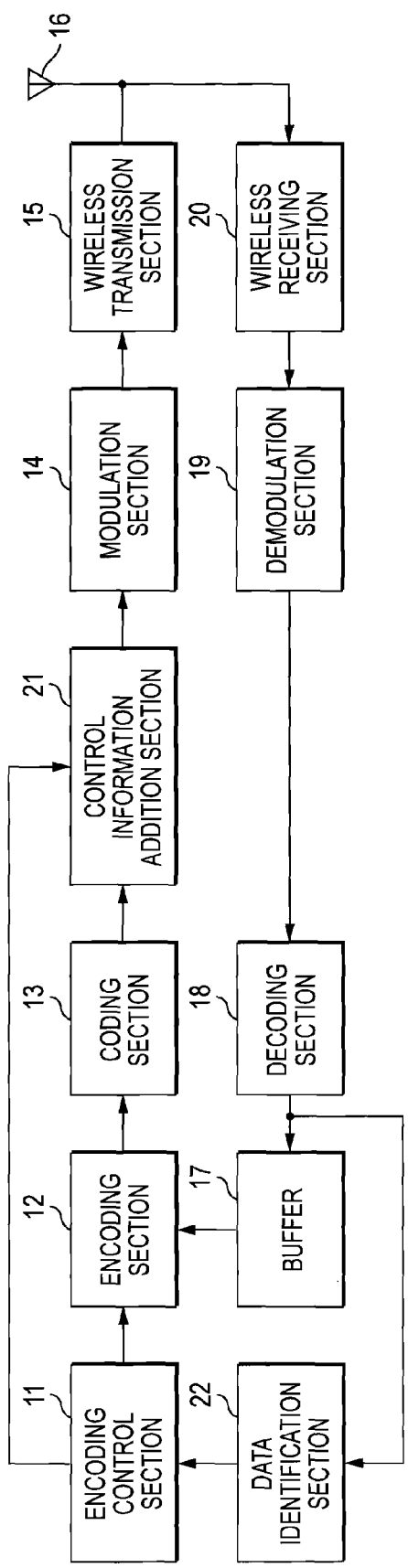
FIG. 17 It is a block diagram of the repeater used when header information is added to network-coded data in the second embodiment of the present invention.
Figure 18:
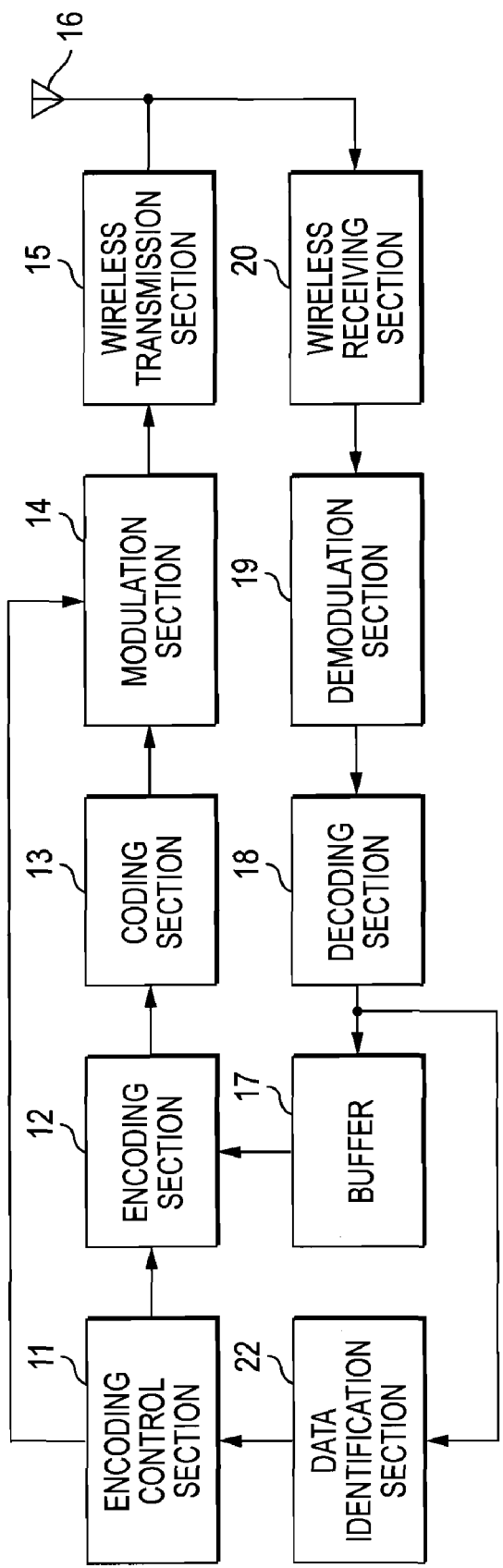
FIG. 18 It is a block diagram of the repeater for a case where control information is transmitted by way of the private channel or the common channel aside from transmission of network-coded data, in the second embodiment of the present invention.

FIG. 17 is a block diagram of the repeater for a case where header information is added to network-coded data. FIG. 18 shows a block diagram of a repeater for a case where control information is transmitted by way of a private channel or a common channel aside from transmission of network-coded data. In the repeater shown in FIG. 17, the encoding control section 11 outputs information about a packet to be subjected to robust processing, or the like, to the control information addition section 21 in accordance with the identification information from the data identification section 22. In the repeater shown in FIG. 18, the encoding control section 11 outputs information about a packet to be subjected to robust processing, and the like, to the modulation section 14 in accordance with the identification information from the data identification section 22.

The method for curtailing control information for notification purpose is illustrated. The MS can previously acquire a sequence order or RV information by reading header information about a transmission packet. Specifically, the MS can beforehand ascertain a packet that the RS subjects to robust processing during network-coding operation. Therefore, a necessity for transmitting control information showing a packet to be subjected to robust processing, among pieces of control information reported from the RS to the MS, can be obviated.

In relation to the operation, which is described in connection with the first embodiment, for making it possible for the MS and the BS to decode the data relayed through network-coding by the RS without associated signaling, the MS beforehand acquires a sequence order or an RV, and the old packets are transmitted at the position of the data S1 that has previously been determined by the RS, the MS, and the BS and that corresponds to a location where packets to be subjected to robust processing are arranged, whereby control information for notification can likewise be reduced.

Third Embodiment

A third embodiment describes another example in which packets that will affect a transmission delay of a system (a resultantly-affected delay will exceed the maximum delay time) are preferentially subjected to robust processing by use of a free resource for network-coding purpose, to thus be network-coded.

A difference between the first embodiment and the second embodiment lies in that a free resource is distributed in accordance with the degree of influence on a transmission delay of a plurality of packets. Specifically, a much greater free resource is distributed to a packet that imposes a larger degree of influence on a transmission delay, and the packet is then subjected to robust processing.

The plurality of packets are subjected to robust processing, whereby a receiving characteristic of each of the packets is enhanced, and a mean delay of the system can further be diminished.

(Wireless Repeater of the Third Embodiment)

The wireless repeater is identical with that of the first embodiment or the second embodiment in terms of a configuration.

(Operation of the Third Embodiment)

The encoding control section 11 performs control operation so as to preferentially subject packets that will affect a transmission delay of a system (a resultantly-affected delay will exceed the maximum delay time) to robust processing. A plurality of packets at this time undergo robust processing according to the degree of influence on a delay.

A transmission sequence of uplink packets is determined to be S1, S3, and S5. In this case, the data S1 exhibit the largest degree of influence on a delay at a point in time the RS performs relaying operation, and the data S3 exhibit the second largest degree of influence. The data S5 exhibit the third largest degree of influence. Encoding rates of the respective sets of the data are set as follows according to the degree of influence (a packet preferentially undergoes robust processing with a reduction in an encoding rate).

Encoding rate of S1<encoding rate of S3<encoding rate of S5

Figure 19:
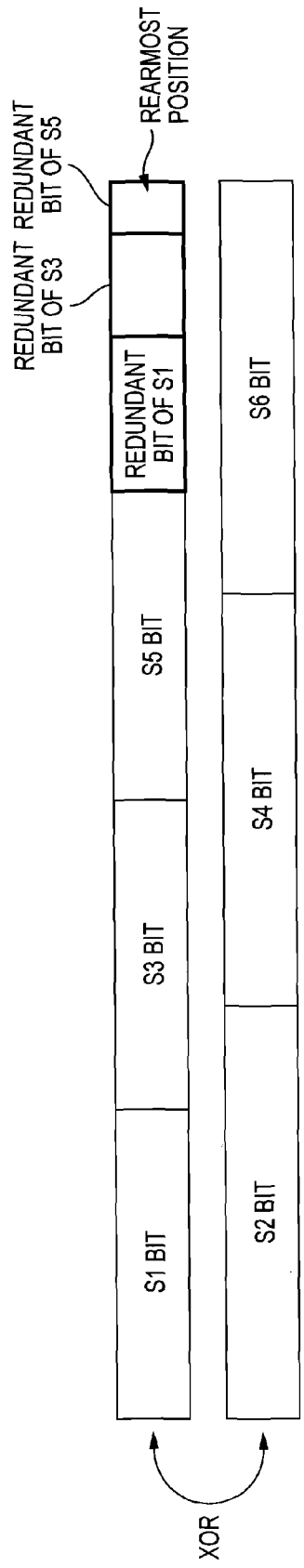
FIG. 19 It is a view showing an example in which a free resource is placed at the rearmost end in the third embodiment of the present invention.

FIG. 19 shows an example arrangement where a free resource is placed at the rearmost position. An increase in redundancy bit associated with a reduction in encoding rate is allocated to a free resource. Determination of a delay time among a plurality of packets (a determination as to which of packets is subjected to robust processing) is as described in connection with the first embodiment and the second embodiment.

The following two methods are described in connection with operation for enabling the MS and the BS to decode the data relayed by the RS through network-coding operation.

(Operation Performed when Signaling is not Used)

There is described operation performed in a case where additional signaling is not required when the MS and the BS decode the data network-coded by the RS.

Packets to be subjected to robust processing among the RS, the MS, and the BS and a robust processing method for the packets are previously set. In the embodiment, the data S1, S3, and S5 are taken as packets to be subjected to robust processing, and respective encoding rates of the data for error correction are previously set as a robust processing method. Further, the position of the free resource is previously set.

Figure 20:
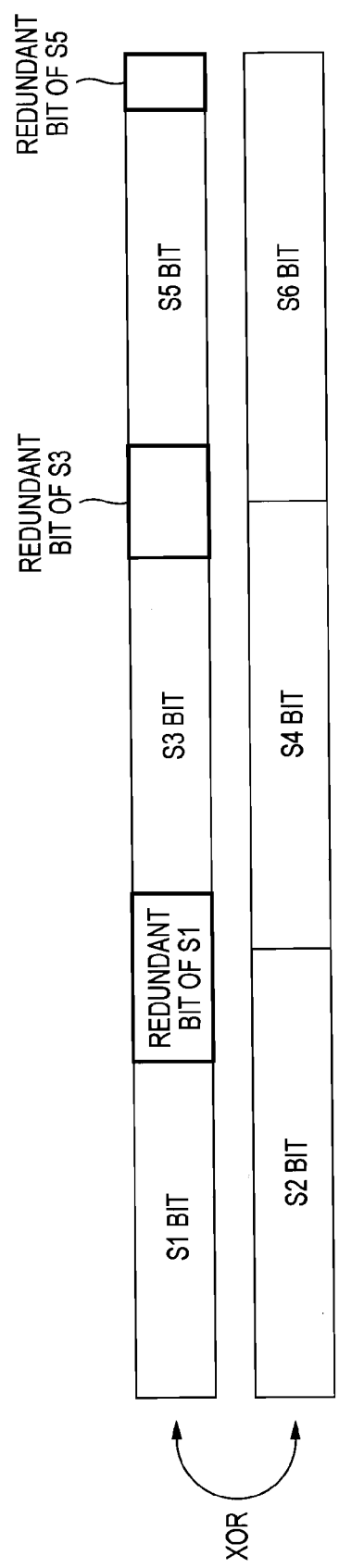
FIG. 20 It is a view showing an example in which the free resource is placed at a position continual to a packet to be subjected to robust processing in the third embodiment of the present invention.

A considered position of a free resource is the rearmost position (FIG. 19) or positions continual to respective packets to be subjected to robust processing. FIG. 20 shows an example in which a free resource is placed at a position continual to a packet to be subjected to robust processing. As mentioned above, the information required when the MS and the BS perform decoding operation is previously set, and the RS performs robust processing in accordance with the information, and the thus-processed data are then subjected to network-coding and transmitted.

(Operation Performed when Signaling is Used)

There is described operation performed in a case where additional signaling is required when the MS and the BS decode the data network-coded by the RS.

The RS determines a plurality of packets to be subjected to robust processing, a robust processing method for the respective packets, and a position of a free resource. The RS separately notifies the MS and the BS about the thus-determined information. The notifying method is the same as that described in connection with the first embodiment.

Fourth Embodiment

A fourth embodiment describes an example in which packets that will affect a transmission delay of a system (a resultantly-affected delay will exceed the maximum delay time) are preferentially subjected to robust processing by use of a free resource for network-coding purpose as well as a free resource which will arise when an error occurs in the packets, to thus be network-coded.

Since robust processing using a much greater free resource becomes available, the receiving characteristic of the packets are enhanced, so that a mean delay of the system can be reduced.

(Wireless Repeater of the Fourth Embodiment)

Figure 21:
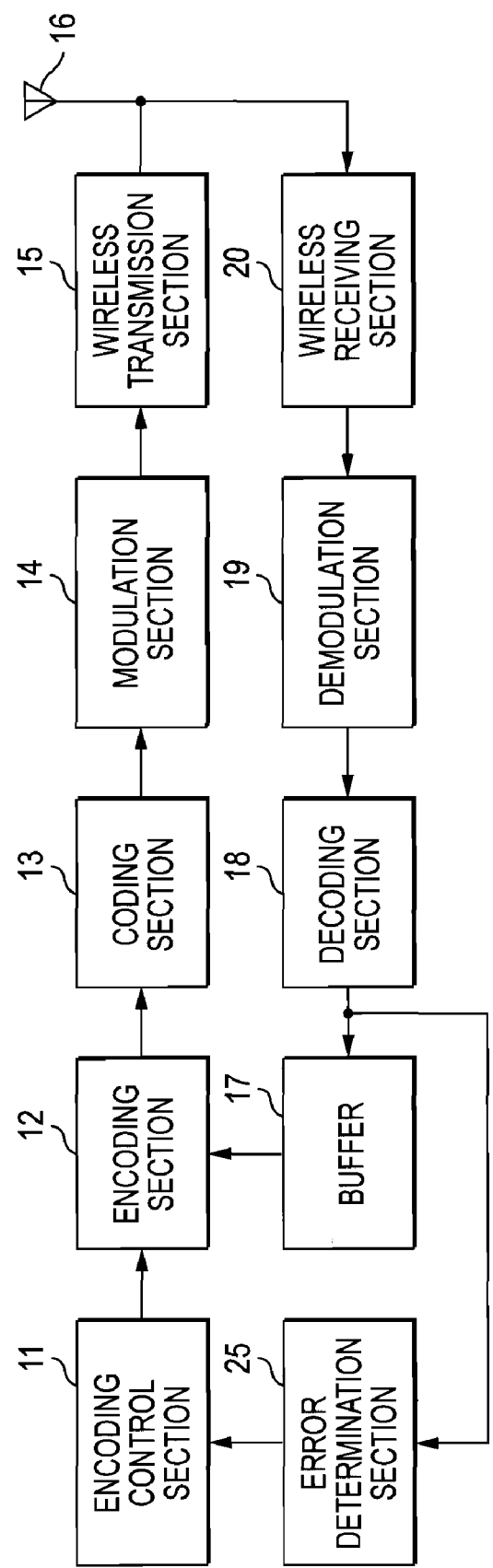
FIG. 21 It is a view showing a configuration of a wireless repeater of a fourth embodiment of the present invention.

FIG. 21 shows a configuration of the wireless repeater of the fourth embodiment. Explanations are given solely to the difference between the first embodiment and the fourth embodiment. In addition to including the configuration of the first embodiment (shown in FIG. 6), the wireless repeater of the fourth embodiment shown in FIG. 21 has an error determination section 25. The error determination section 25 makes an error determination in accordance with the received packet decoded by the decoding section 18 by means of CRC, or the like, and outputs a determination result to the encoding control section 11. The encoding control section 11 determines an encoding rate of a packet from the determination result from the error determination section 25, and outputs the thus-determined encoding rate to the encoding section 12.

(Operation of the Fourth Embodiment)

The encoding control section 11 performs control operation such that packets that will affect a transmission delay of the system (a resultantly-affected delay will exceed the maximum delay time) are preferentially subjected to robust processing. A free resource caused by a packet error is also used for robust processing.

Figure 22:
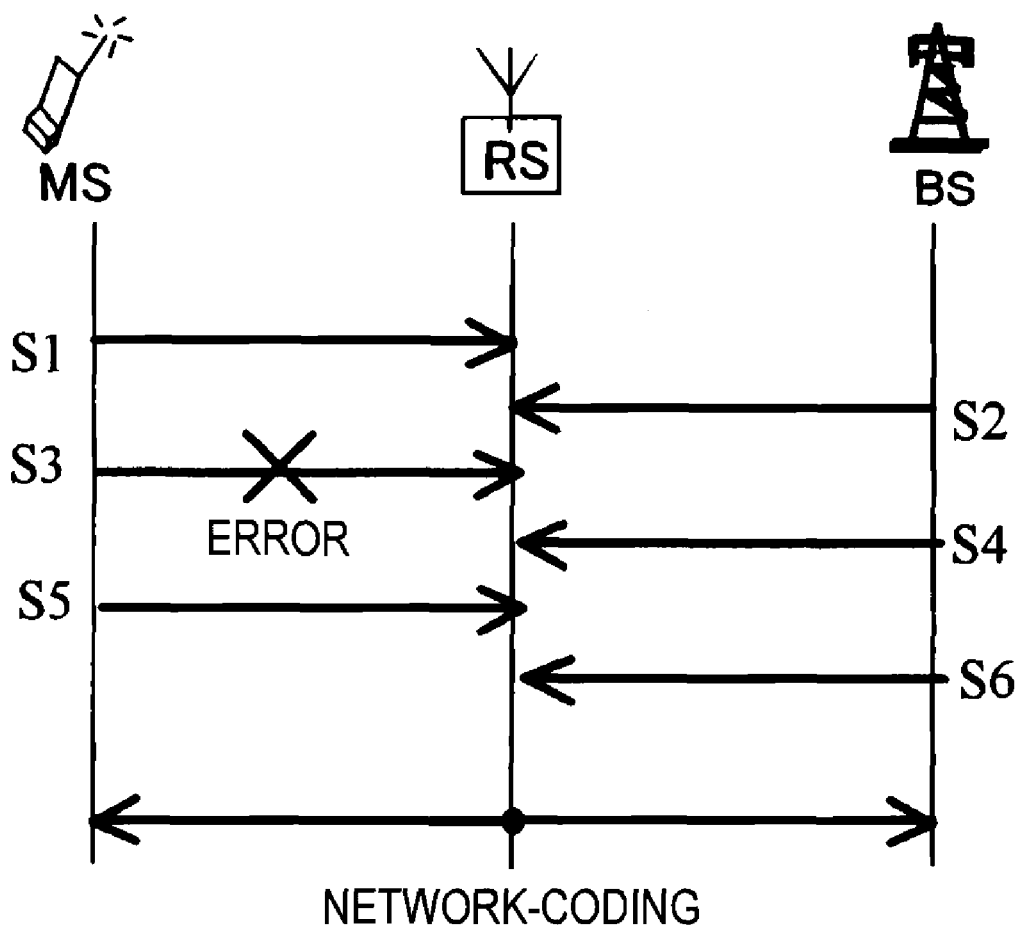
FIG. 22 It is a view showing a transmission model of the fourth embodiment of the present invention.

FIG. 22 shows a transmission model of the fourth embodiment. The transmission sequence of uplink packets is assumed to be determined as the data S1, the data S3, and the data S5, and an error is assumed to have arisen in transmission of the data S3. The network-coding resource for the data S3 becomes free at this time. The free resource is used for subjecting the data S1 to robust processing.

Figure 23:
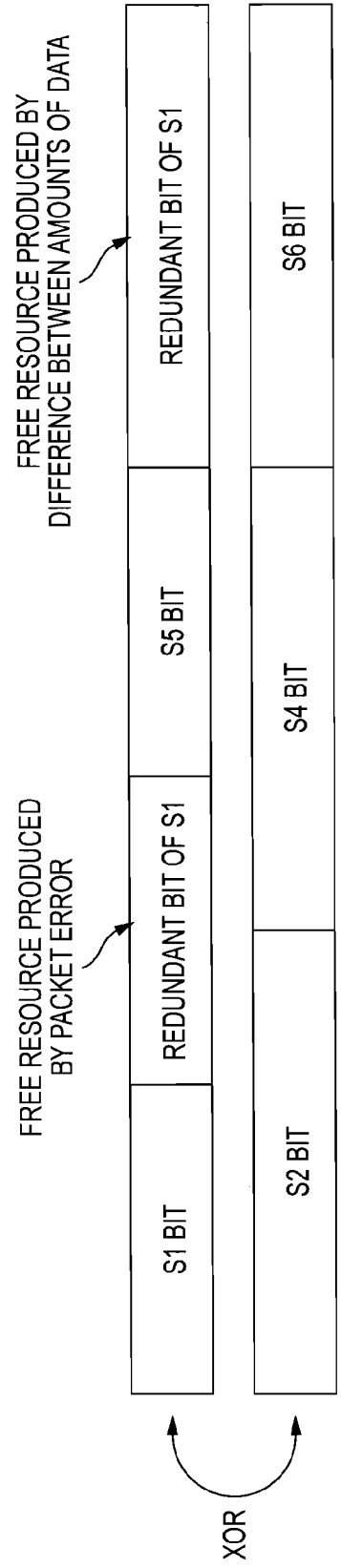
FIG. 23 It is a view showing an example in which a free resource caused by an erroneous packet is taken as an erroneous packet position and in which a free resource stemming from a difference between amounts of data is placed at the rearmost end in the fourth embodiment of the present invention.

FIG. 23 shows an example in which a free resource caused by a packet error is taken as a position of an error packet and in which a free resource caused by difference between amounts of data is placed at the rearmost position. Although the fourth embodiment is identical with the first and second embodiments of the present invention in terms of a standard for selecting a target to be subjected to robust processing (S1) and the robust processing method. However, since the resource for robust processing is greater than that employed in the first embodiment, a failure can be made much harder to arise.

Operation for enabling the MS and the BS to decode the data relayed by the RS by means of network-coding is now described.

(A Case of Use of an ACK/NACK Signal)

Figure 26:
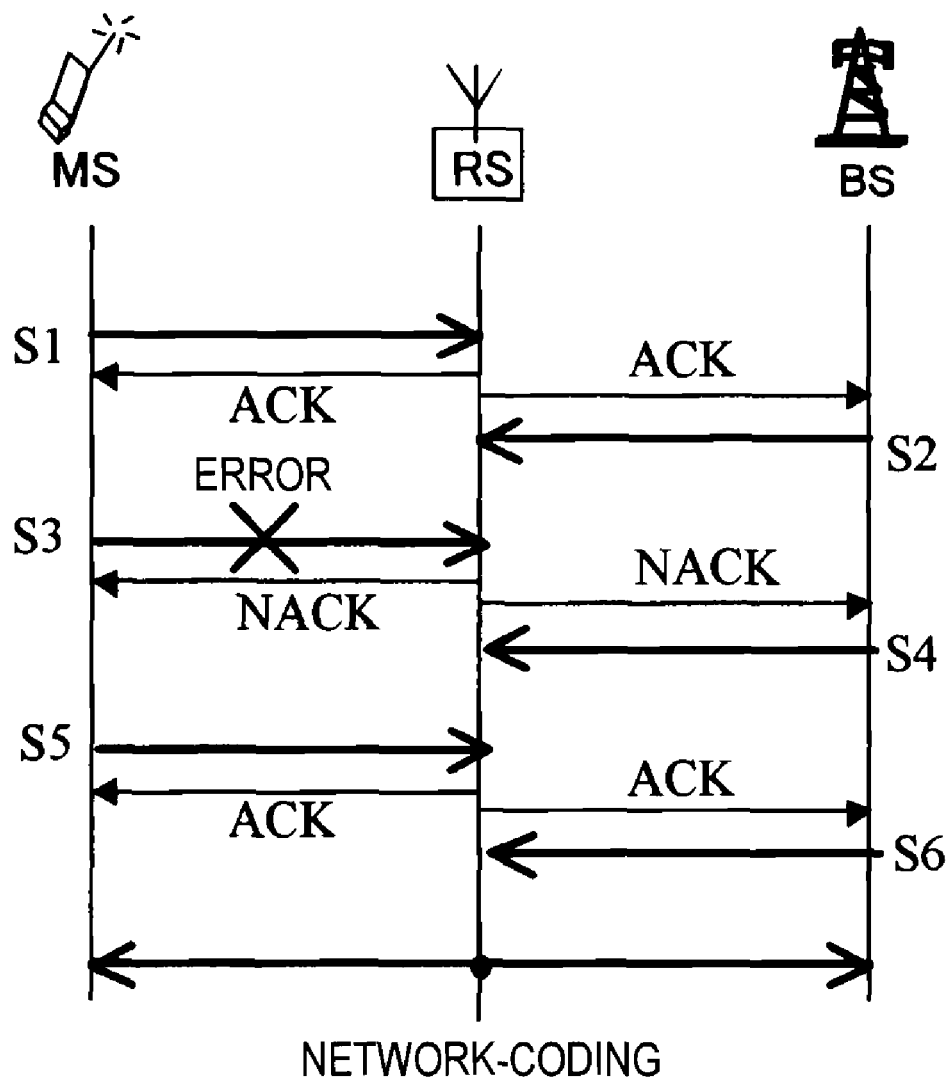
FIG. 26 It is a view showing example signaling of the fourth embodiment of the present invention using ACK/NACK signaling.
Figure 27:
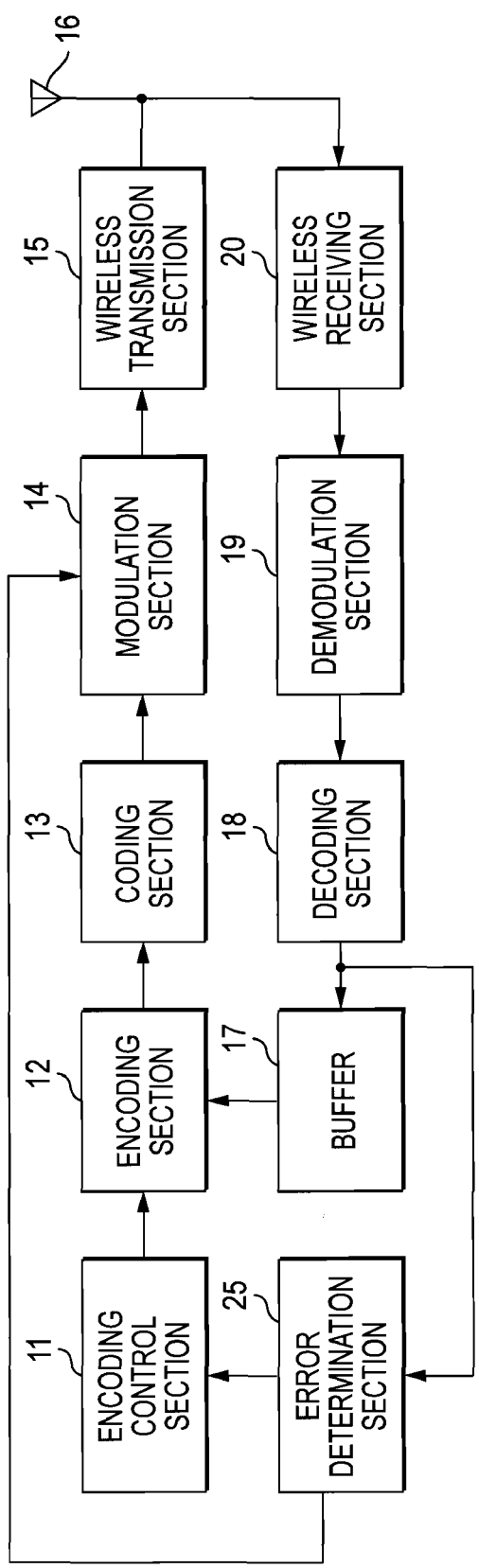
FIG. 27 It is a view showing a block diagram of a repeater of the fourth embodiment of the present invention in which ACK/NACK signaling is relayed.

Explanations are given to a case where, when the MS and the BS decode the data network-coded by the RS, diversion of an ACK/NACK signal for retransmission control purpose is carried out without a necessity for additional signaling for decoding purpose. FIG. 26 shows a signaling example using ACK/NACK signaling. FIG. 27 is a view showing the configuration of a repeater achieved when an ACK/NACK signal employed in connection with the fourth embodiment is relayed.

As shown in FIG. 26, the RS also notifies the BS about ACK/NACK signaling carried out between the MS and the RS. Specifically, in the repeater shown in FIG. 27, the error determination section 25 outputs a result of error determination of a received packet to the modulation section 14. A determination result output to the modulation section 14 is modulated by the modulation section 14. The thus-modulated determination result is transmitted from the antenna 16 after having undergone wireless transmission processing in the wireless transmission section 15. The RS thereby notifies the BS about occurrence of a free resource caused by a packet error. Layout positions for a free resource attributable to a packet error occurred among the RS, the MS, and the BS and a free resource attributable to a difference in amounts of data are previously set.

Conceivable methods for setting the layout positions for free resources include (1) a method for taking the position of a free resource caused by a packet error as the position of an erroneous packet and placing a free resource caused by a difference in amounts of data at the rearmost position (FIG. 23); (2) a method for continually placing double free resources at the rearmost position; and (3) a method for continually placing double free resources for each packet to be subjected to robust processing.

Figure 24:
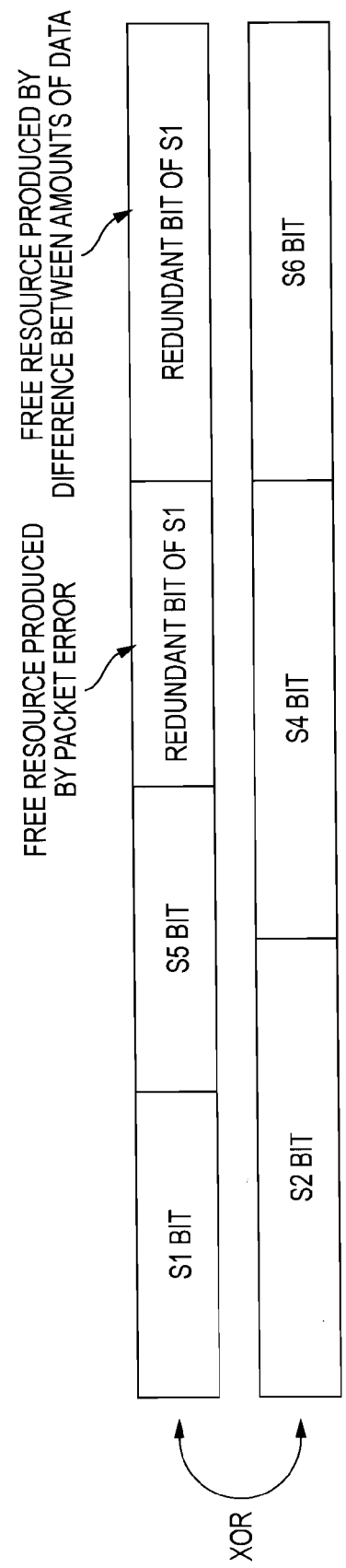
FIG. 24 It is a view showing an example in which a free resource is continually placed at the rearmost end in the fourth embodiment of the present invention.
Figure 25:
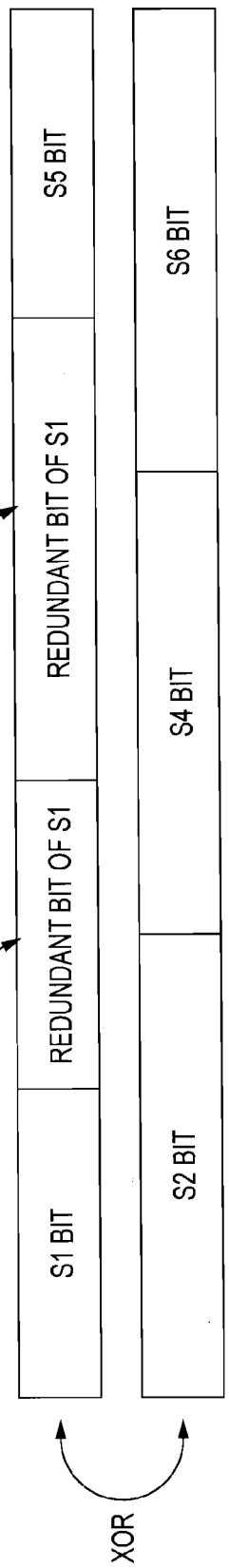
FIG. 25 It is a view showing an example in which the free resource is placed at a position continual to a packet to be subjected to robust processing in the fourth embodiment of the present invention.

FIG. 24 shows an example of the layout method (2) for continually placing free resources at the rearmost position. FIG. 25 shows an example of the layout method (3) for continually placing a free resource in a packet to be subjected to robust processing.

A packet to be subjected to robust processing is also set in advance in conformance with a specific standard (S1 in the case of the present embodiment). An ACK/NACK signal exchanged between the MS and the RS is also notified to the BS by means of the configuration, whereby information about a free resource caused by a packet error is shared among the RS, the MS, and the BS. Further, information required at the time of decoding operations of the MS and the BS is previously set. In accordance with information, the RS subjects a packet to robust processing and network coding and then transmits the network-coded packet.

(Case of Use of Signaling)

Figure 28:
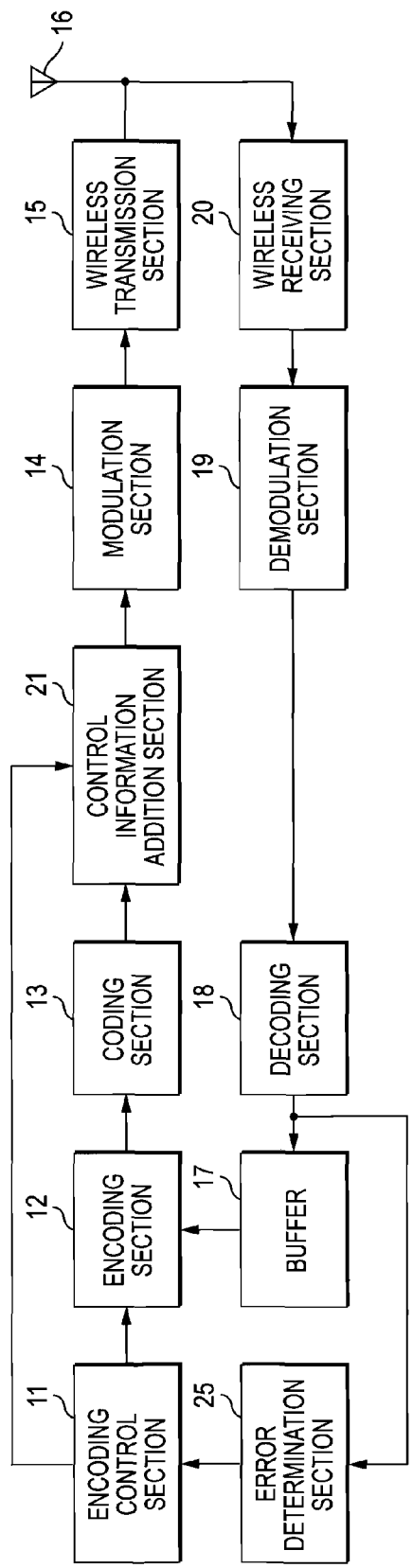
FIG. 28 It is a view showing a block diagram of the repeater of the fourth embodiment of the present invention in which header information is added.
Figure 29:
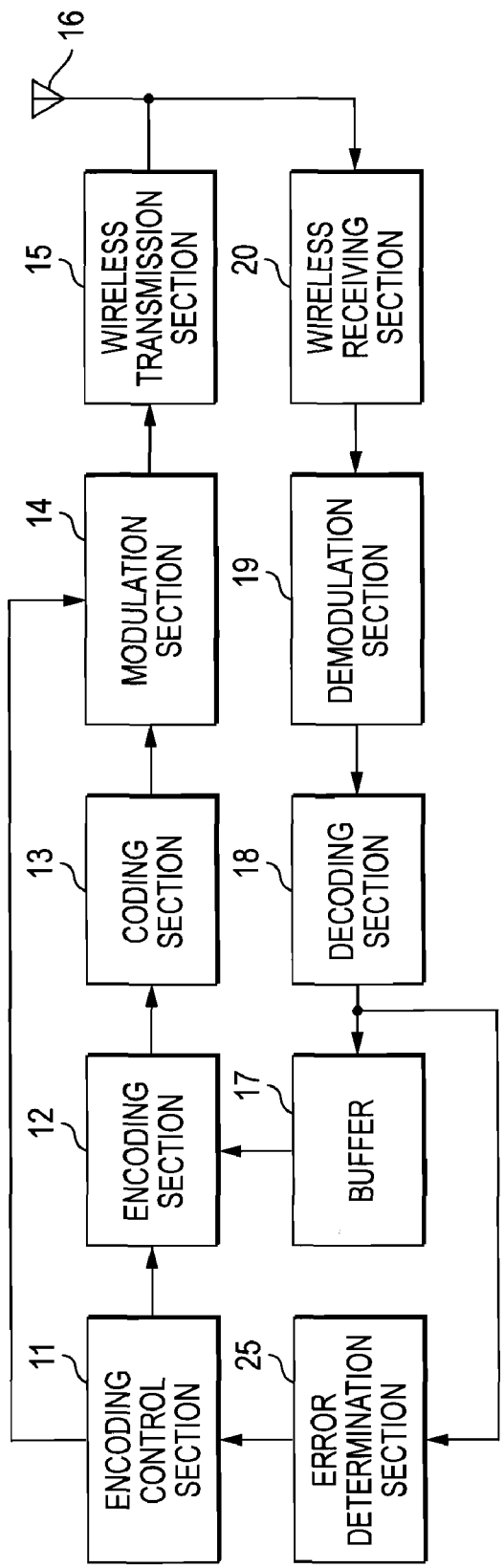
FIG. 29 It is a view showing a block diagram of the repeater of the fourth embodiment of the present invention in which control information is transmitted.

Operation performed in the case of use of signaling becomes operation for notifying all pieces of required information. Since the operation is identical with that described in connection with the first embodiment, its explanation is omitted. FIG. 28 shows a block diagram of a repeater employed for the case of addition of header information in the fourth embodiment. FIG. 29 shows a block diagram of a repeater employed for the case of transmission of control information in the fourth embodiment. In the repeater shown in FIG. 28, the encoding control section 11 outputs information about a packet to be subjected to robust processing, or the like, to the control information addition section 21 in accordance with an error determination result from the error determination section 25. In the repeater shown in FIG. 29, the encoding control section 11 outputs information about a packet to be subjected to robust processing, or the like, to the modulation section 14 in accordance with the error determination result from the error determination section 25.

Fifth Embodiment

In a fifth embodiment, when retransmission is performed as a result of occurrence of a packet error, a packet retransmitted a larger number of times is subjected to robust processing by priority.

Since a packet which will cause a delay in excess of the maximum delay time as a result of occurrence of retransmission can be subjected to robust processing, a receiving characteristic of the packet is enhanced, so that a mean delay of the system can be diminished.

(Wireless Repeater of the Fifth Embodiment)

The configuration of the fifth embodiment is identical with that of the fourth embodiment.

(Operation of the Fifth Embodiment)

A difference between the fourth embodiment and the fifth embodiment lies in that the encoding control section 11 controls a free resource caused by a packet error in such a way that a packet retransmitted a large number of times is subjected to robust processing.

Figure 30:
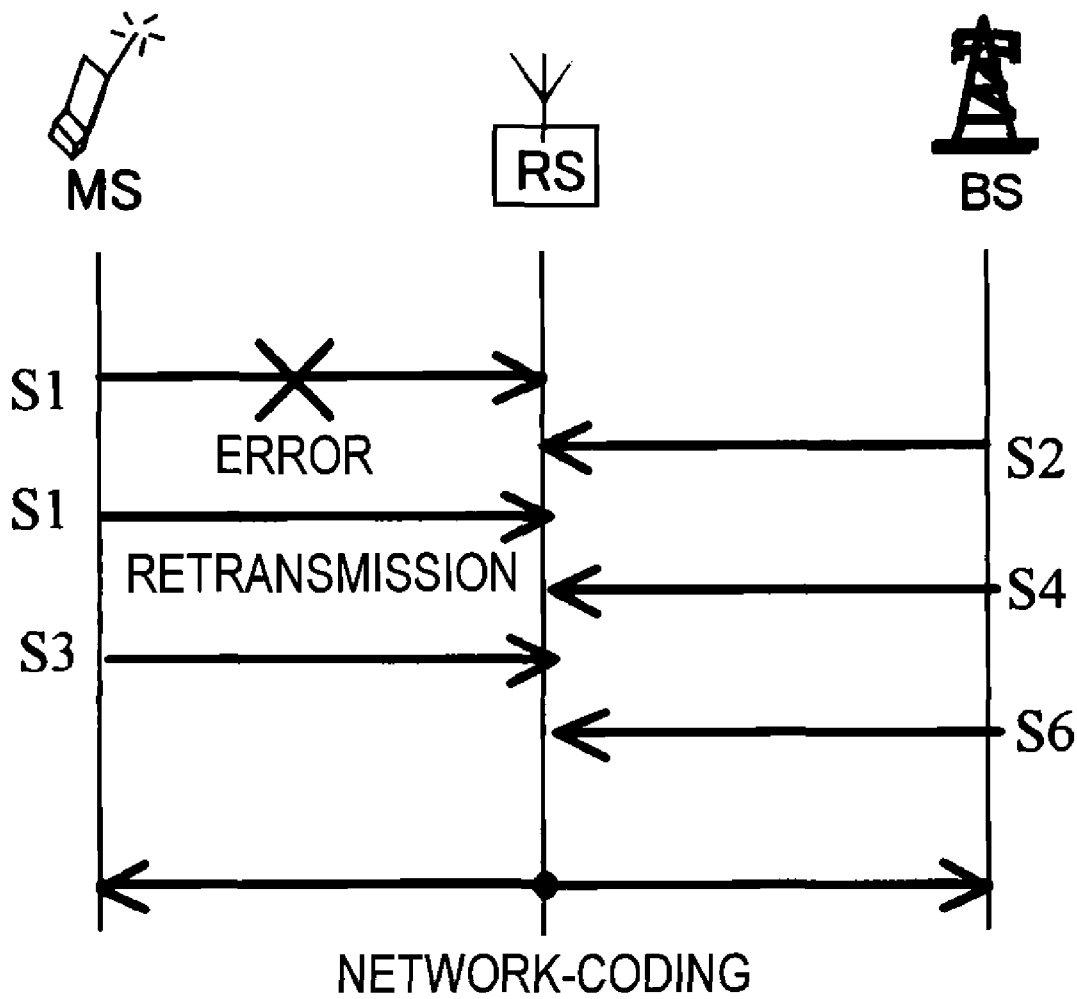
FIG. 30 It is a view showing a transmission model of a fifth embodiment of the present invention.

FIG. 30 shows a transmission model of the fifth embodiment. The model is based on an assumption that the data S1 will be retransmitted as a result of occurrence of a failure in first transmission of the data S1. A resource for network-coding equivalent to the resource for first transmission of the data S1 becomes a free resource.

Figure 31:
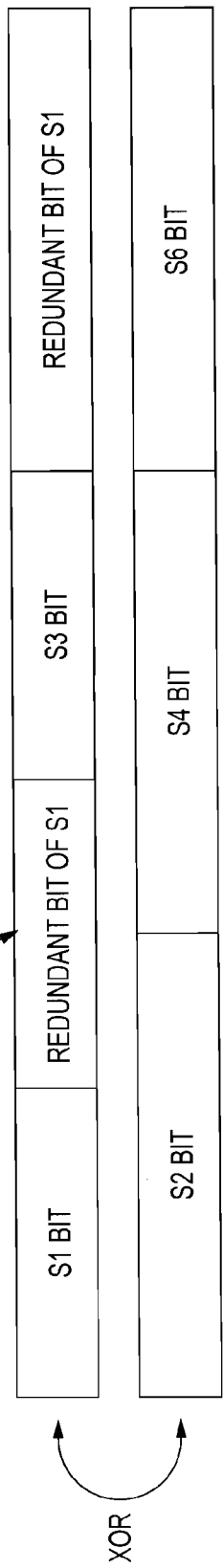
FIG. 31 It is a descriptive view showing a case where a free resource is used for robust processing, in the fifth embodiment of the present invention.

FIG. 31 is a descriptive view for a case where a free resource occurred in the transmission model shown in FIG. 30 is subjected to robust processing. The free resource is added to the free resource caused by a difference between amounts of data, and a resultant resource is used for subjecting the data S1, which has been determined to be retransmitted, to robust processing.

Operation for enabling the MS and the BS to decode the data relayed by the RS by means of network-coding is now described. Operation performed in the case of use of signaling becomes operation for notifying all pieces of required information. Since the operation is identical with that described in connection with the first embodiment, its explanation is omitted.

(A Case of Use of an ACK/NACK Signal)

Explanations are given to a case where, when the MS and the BS decode the data network-coded by the RS, diversion of an ACK/NACK signal for retransmission control purpose is carried out without a necessity for additional signaling for decoding purpose.

The RS also notifies the BS about ACK/NACK signaling carried out between the MS and the RS, thereby notifying the BS about occurrence of a free resource caused by a packet error. The layout method for a free resource caused by a packet error and the free resource caused by a difference in amounts of data is identical with that described in connection with the fourth embodiment. The BS recognizes the packet switched from NACK to ACK as a packet that is an object of robust processing (a retransmission packet) (the data S1 in the present embodiment).

ACK/NACK signaling carried out between the MS and the RS is notified also to the BS by means of the configuration, whereby the information about a free resource caused by a packet error and a packet that is an object of robust processing are shared among the RS, the MS, and the BS. Information required when the MS and the BS perform decoding operation is previously set. In conformance with the information, the RS subjects the packet to robust processing and subsequently to network-coding, and transmits the thus-network-coded packet.

Sixth Embodiment

A sixth embodiment describes an example in which resources, including a free resource caused when an error has arisen in a packet, are distributed according to the degree of influence on the transmission delay of a plurality of packets. Specifically, the packet that exerts a greater degree of influence on a delay is provided with a distribution of a greater amount of free resource, to thus undergo robust processing.

A plurality of packets are respectively subjected to robust processing using greater amounts of free resource, whereby receiving characteristics of the respective packets are improved, so that a mean delay of the system can further be reduced.

(Wireless Repeater of the Sixth Embodiment)

The configuration of the sixth embodiment is identical with that of the fourth embodiment.

(Operation of the Sixth Embodiment)

The operation of the sixth embodiment is identical with that of the third embodiment in that a plurality of packets are subjected to robust processing. The difference between the embodiments lies in that a free resource caused by a packet error is also used for robust processing.

Figure 32:
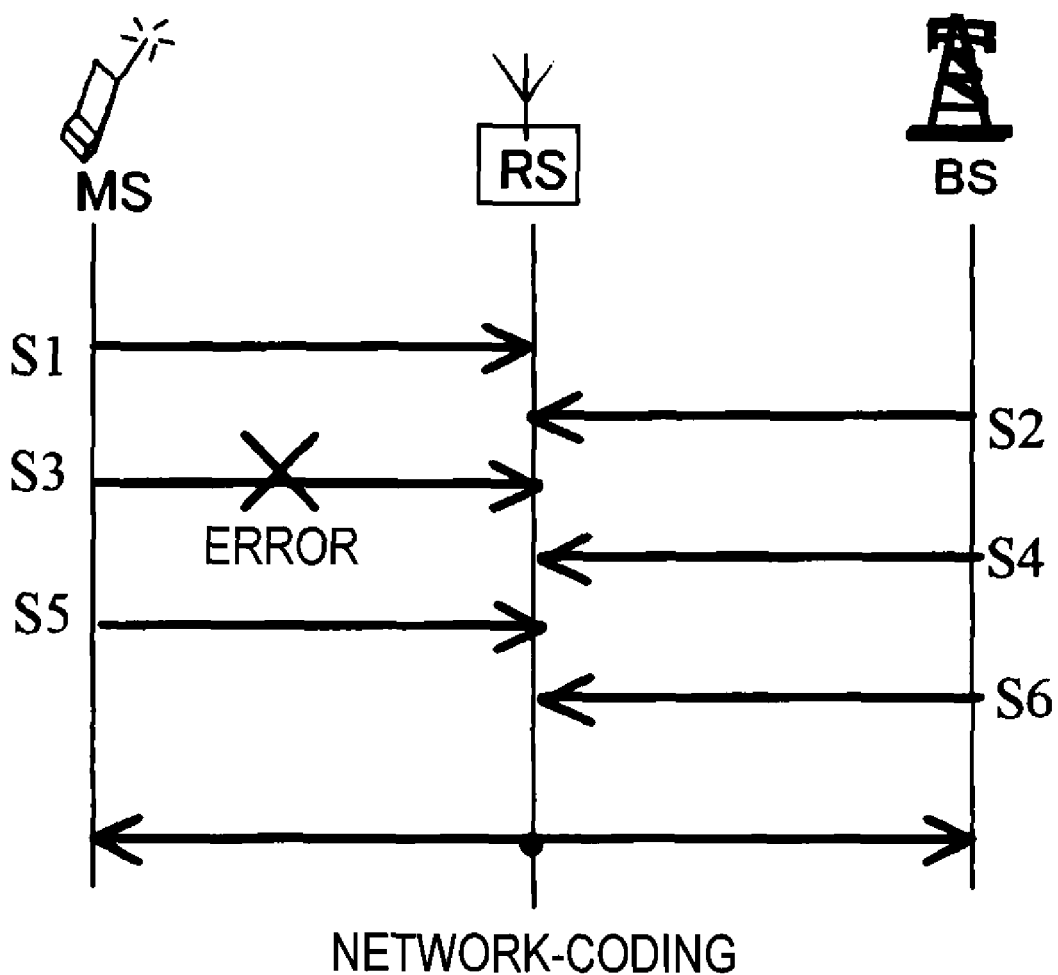
FIG. 32 It is a view showing a transmission model of a sixth embodiment of the present invention.

FIG. 32 shows a transmission model of the sixth embodiment. The uplink data S3 are assumed to have become an error. A network-coding resource for the data S3 becomes a free resource at this time. The free resource is used for subjecting the data S1 and S5 to robust processing.

There is described operation for enabling the MS and the BS to decode the data relayed by the RS by means of network-coding operation. Operation using signaling becomes operation for notifying all pieces of necessary information and becomes identical with that described in connection with the fourth embodiment, and hence its explanation is omitted.

(A Case of Use of an ACK/NACK Signal)

Figure 36:
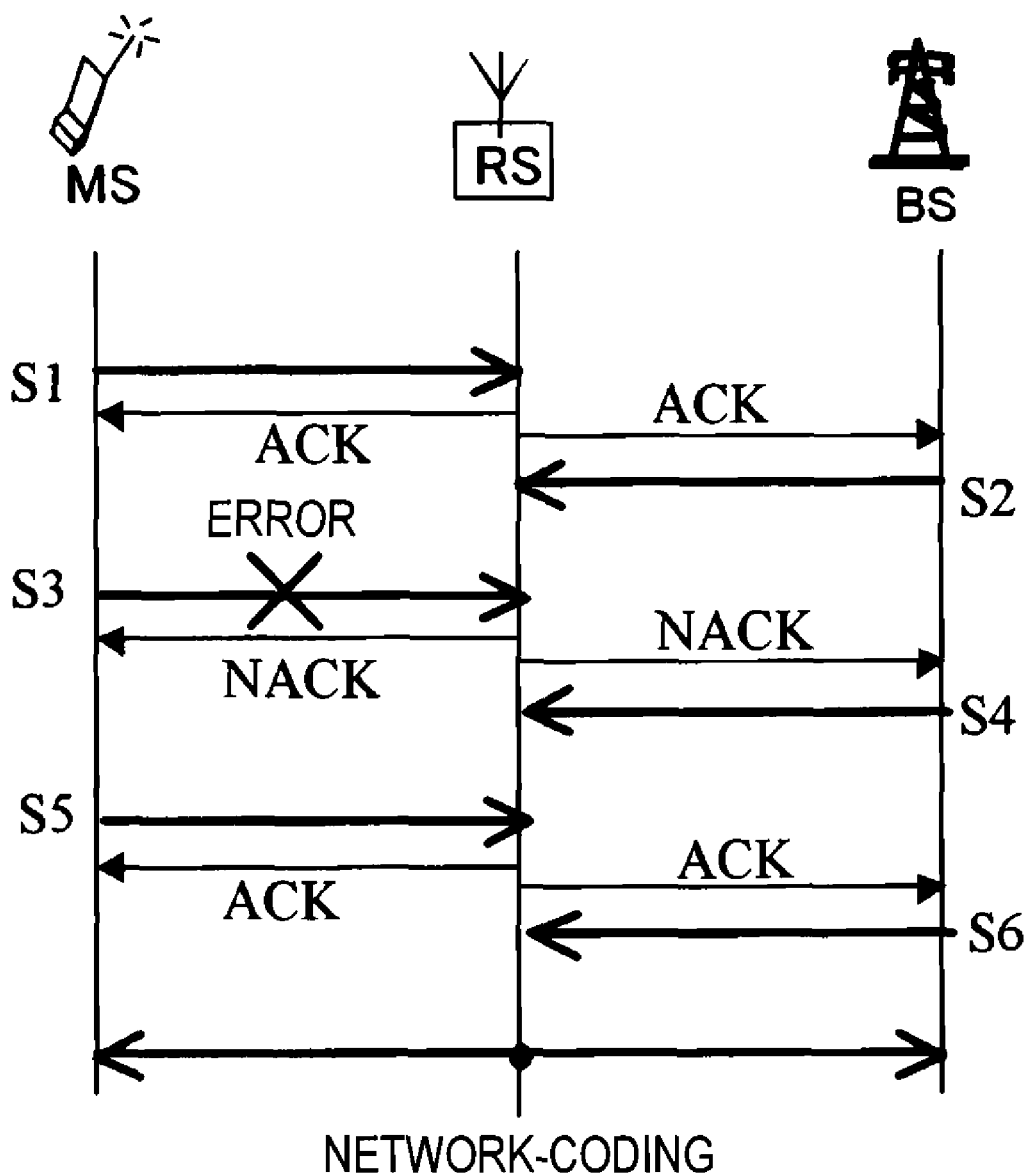
FIG. 36 It is a view showing example signaling using an ACK/NACK signal of the sixth embodiment of the present invention.

FIG. 36 shows example signaling using an ACK/NACK signal. The present embodiment is identical with the fourth embodiment in that the RS notifies an ACK/NACK signal exchanged between the MS and the RS to the BS, as well, thereby reporting occurrence of a free resource attributable to a packet error to the BS. Further, the present embodiment is also identical with the fourth embodiment in that a method for allocating a free resource among the RS, the MS, and the BS is set in advance.

Figure 33:
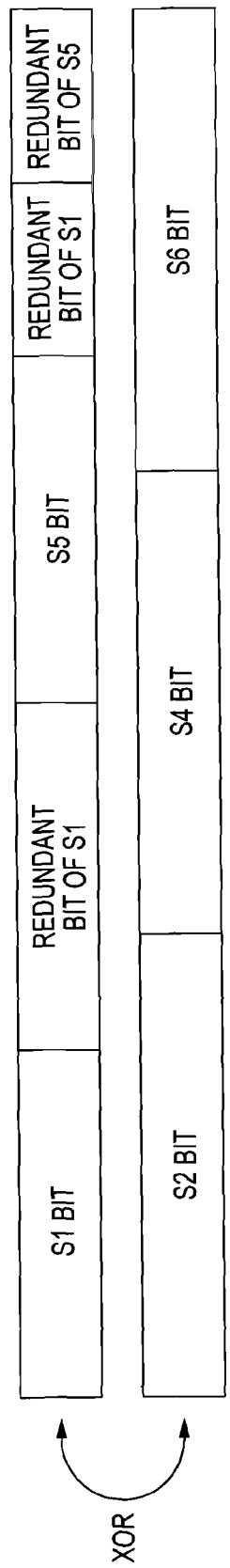
FIG. 33 It is a view showing an example in which a free resource caused by an erroneous packet is taken as an erroneous packet position and in which a free resource stemming from a difference between amounts of data is placed at the rearmost end, in the sixth embodiment of the present invention.

Specifically, conceivable methods for setting the layout positions for free resources include (1) a method for taking the position of a free resource caused by a packet error as the position of the erroneous packet and placing a free resource caused by a difference in amounts of data at the rearmost position (FIG. 33); (2) a method for continually placing double free resources at the rearmost position; and (3) a method for continually placing a free resource for each packet to be subjected to robust processing.

Figure 34:
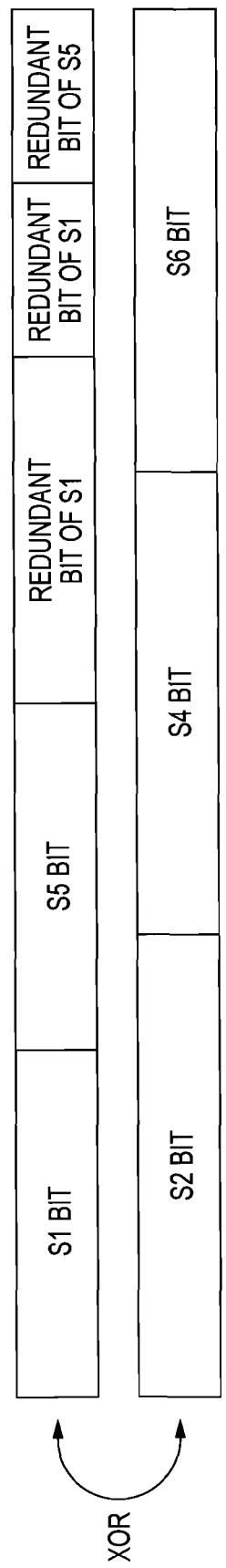
FIG. 34 It is a view showing an example in which double free resources are arranged continually to the rearmost end in the sixth embodiment of the present invention.
Figure 35:
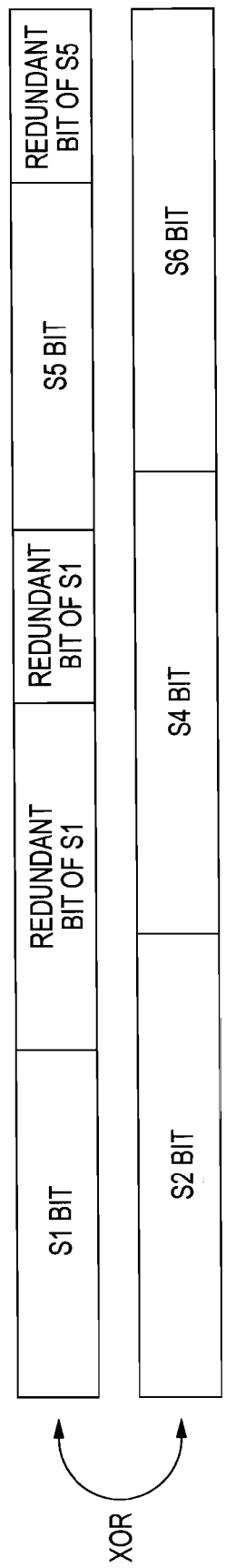
FIG. 35 It is a descriptive view showing a case where a free resource of the sixth embodiment of the present invention is positioned continually to a packet to be subjected to robust processing.

FIG. 33 shows an example of the method (1) in which the position of a free resource caused by a packet error is taken as the position of the erroneous packet and in which a free resource caused by a difference in amounts of data is placed at the rearmost position. FIG. 34 shows an example of the method (2) in which double free resources are continually placed at the rearmost position. FIG. 35 is a descriptive view for the case of the method (3) in which a free resource is continually placed for each packet to be subjected to robust processing.

In the sixth embodiment, a method for subjecting a plurality of packets to robust processing (an encoding rate) is set among the RS, the MS, and the BS. An example method is to define a redundancy bit ratio as S1:S3:S5=3:2:1 and distribute a free resource among packets that have become able to receive free resources, and the like.

The first through sixth embodiments have described the cases where packets are collectively subjected to network-coding in groups of three for each of the uplink and the downlink, the present invention is not limited to these embodiments.

Figure 37:
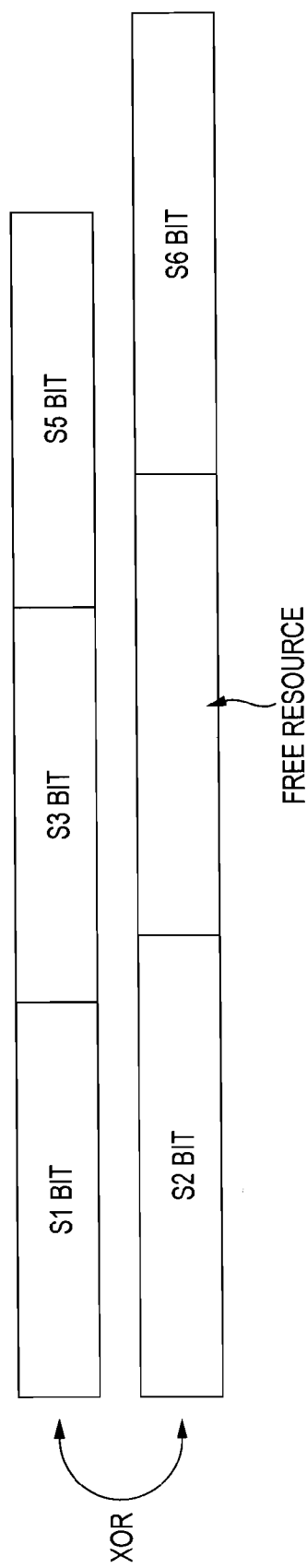
FIG. 37 It is a descriptive view of a case where an error has arisen in a downlink packet in the fourth to sixth embodiments of the present invention.

The fourth to sixth embodiments have described the cases where an error has arisen in an uplink packet (from the MS to the RS). The present invention can also be performed likewise even when an error has arisen in a downlink packet (from the BS to the RS). FIG. 37 is a descriptive view for a case where an error has arisen in a downlink packet.

The third and sixth embodiments describe the cases where the degree of influence on a transmission delay varies. A free space may also be evenly distributed when the degree of influence on a transmission delay is identical.

In the first to sixth embodiments, the MS (mobile station) is also expressed as a UE (User Equipment). In the first through sixth embodiments, the BS (mobile station) is also expressed as a Node B. In the first through sixth embodiments, the RS (wireless repeater) is often expressed as an RN (Relay Node), as well.

In connection with operation for enabling the MS and the BS to decode the data, which have been relayed by the RS through network-coding, without involvement of associated signaling operation, the packet that is an object of robust processing and that should have previously been set among the RS, the MS, and the BS is not limited to the data S1 in the first through sixth embodiments. Any of the sets of data S1, S3, and S5 may also be acceptable, so long as the data are previously set among the RS, the MS, and the BS in conformance with standards.

The second embodiment has provided descriptions about the case where the sequence order or the RV are multiplexed into data. However, there may also be adopted a structure in which the sequence order or the RV is transmitted by way of a channel differing from a data channel. In the second embodiment, the sequence order is frequently expressed also as a sequence number or a fragment offset.

Conceivable division of the data described in connection with the second embodiment includes a case where an IP packet is divided into sizes that enable allocation of packets to wireless resources in a Layer 2 (a data link layer) in the wireless communication apparatus and a case where data of a large size are divided into a plurality of IP packets at a higher-level layer.

In the second embodiment, another conceivable way related to operation for enabling the MS and the BS to decode the data, which have been relayed by the RS through network-coding, without involvement of associated signaling operation is to fix a packet that is an object of robust processing to the data S1 and let the MS transmit a packet having an old sequence order or an old RV at the position of the data S1.

In the third embodiment, still another conceivable way related to operation for enabling the MS and the BS to decode the data, which have been relayed by the RS through network-coding, without involvement of associated signaling operation is to let the MS re-arrange sequence orders or older RVs with respect to the data S1, S3, and S5 and in sequence of the standards and transmit the thus-re-arranged data, when a method for subjecting the data S1, S3, and S5 to robust processing (an encoding rate) is previously set on the basis of the specific standards.

The first through sixth embodiment have described, as example robust processing using a free resource, the method for reducing an encoding rate of error correction encoding operation. However, the invention is not limited to the embodiments. For instance, repetition involving iteration of same data is also acceptable.

The embodiments have described, as examples, the case where the present invention is built from hardware. The present invention can also be implemented by means of software.

Respective functional blocks used in describing the embodiments are implemented in the form of an LSI that is typically an integrated circuit. These blocks may also be individually combined into a single chip or embodied as a single chip so as to comprise some or all of the functional blocks. Although the chip has been herein referred to as an LSI, the chip is often referred to also as an IC, a system LSI, a super LSI, and an ultra LSI according to the degree of integration.

The technique for implementing an integrated circuit is not limited to the LSI. The integrated circuit can also be implemented by a custom-designed circuit or a general-purpose processor. An FPGA (Field Programmable Gate Array) that can be programmed after manufacture of an LSI or a reconfigurable processor that enables reconfiguration of connections and settings of circuit cells in an LSI may also be utilized.

If a technique of implementing an integrated circuit that is substituted by another technique resultant from advancement or derivation of the semiconductor technique emerges, the functional blocks may naturally be integrated by use of the technique. An application of biological technology, or the like, is feasible.

Although the present invention has been described in detail and by reference to the specific embodiments, it is manifest to those skilled in the art that various alterations and modifications be added to the present invention without departing the spirit and scope of the present invention.

The present patent application is based on Japanese Patent Application (JP-2007-309020) filed on Nov. 29, 2007, the entire subject matter of which is incorporated herein by reference.

INDUSTRIAL APPLICABILITY

The present invention yields an advantage of the ability to enhance receiving performance achieved at the time of transmission of network-coded data and reduce transmission delay of a system and can be utilized as a wireless communication apparatus, a wireless communication method, and the like.

The invention claimed is:

1. A wireless communication apparatus that receives a plurality of first packets from a first wireless communication apparatus and a plurality of second packets, which is collectively greater than the plurality of first packets in an amount of data, from a second wireless communication apparatus and that transmits a third signal, which has the same amount of data as the plurality of second packets collectively, to the first wireless communication apparatus and the second wireless communication apparatus, the wireless communication apparatus comprising:

an error-correction encoder configured to generate a plurality of redundant packets by reducing an encoding rate of an earliest received packet included in the plurality of first packets in accordance with respective influence degrees on a transmission delay; and a coder configured to generate the third signal by combining a first signal, which is generated by appending the plurality of first packets together and arranging the plurality of redundant packets in free resources of the first signal so as to distribute a greater amount of free resources to packets imposing a larger influence degree on the transmission delay, with a second signal, generated by appending the plurality of second packets, in a separable manner.

2. The wireless communication apparatus according to claim 1, further comprising:

an error determination section configured to determine an error packet included in the plurality of first packets, wherein the error-correction encoder arranges a redundant packet of the plurality of redundant packets in a free resource made available by non-transmission of the error packet in the first signal.

3. The wireless communication apparatus according to claim 2, wherein the error-correction encoder generates the redundant packet by reducing an encoding rate of a packet retransmitted a largest number of times of the plurality of first packets.

4. The wireless communication apparatus according to claim 2, wherein the error-correction encoder generates the plurality of redundant packets by subjecting respective packets in the plurality of first packets with the robust processing in accordance with respective influence degrees on a transmission delay of a system; and
   wherein the coder arranges the plurality of redundant packets in the free resource made available by non-transmission of the error packet in the first signal.

5. A wireless communication apparatus that receives a plurality of first packets from a first wireless communication apparatus and a plurality of second packets, which is collectively greater than the plurality of first packets in an amount of data, from a second wireless communication apparatus and that transmits a third signal, which has the same amount of data as the plurality of second packets collectively, to the first wireless communication apparatus and the second wireless communication apparatus, the wireless communication apparatus comprising:
   a data identification section configured to identify a packet having an oldest sequence order in the plurality of first packets;
   an error-correction encoder configured to generate a plurality of redundant packets by reducing an encoding rate of the packet having the oldest sequence order of the plurality of first packets in accordance with respective influence degrees on a transmission delay; and
   a coder configured to generate the third signal by combining a first signal, which is generated by appending the plurality of first packets together and arranging the plurality of redundant packets in free resources of the first signal so as to distribute a greater amount of free resources to packets imposing a larger influence degree on the transmission delay, with a second signal, generated by appending the plurality of second packets, in a separable manner.

6. The wireless communication apparatus according to claim 5, further comprising:
   an error determination section configured to determine an error packet included in the plurality of first packets,
   wherein the error-correction encoder arranges a redundant packet of the plurality of redundant packets in a free resource made available by non-transmission of the error packet in the first signal.

7. The wireless communication apparatus according to claim 6, wherein the error-correction encoder generates the redundant packet by reducing an encoding rate of a packet retransmitted a largest number of times of the plurality of first packets.

8. The wireless communication apparatus according to claim 6, wherein the error-correction encoder generates the plurality of redundant packets by subjecting respective packets in the plurality of first packets with the robust processing in accordance with respective influence degrees on a transmission delay of a system; and
   wherein the coder arranges the plurality of redundant packets in the free resource made available by non-transmission of the error packet in the first signal.

9. A wireless communication apparatus that receives a plurality of first packets from a first wireless communication apparatus and a plurality of second packets, which is collectively greater than the plurality of first packets in an amount of data, from a second wireless communication apparatus and that transmits a third signal, which has the same amount of data as the plurality of second packets collectively, to the first wireless communication apparatus and the second wireless communication apparatus, the wireless communication apparatus comprising:
   a data identification section that identifies a packet having an earliest redundancy version of the plurality of first packets;
   an error-correction encoder configured to generate a plurality of redundant packets by reducing an encoding rate of the packet having the earliest redundancy version in the plurality of first packets in accordance with respective influence degrees on a transmission delay of a system; and
   a coder configured to generate the third signal by combining a first signal, which is generated by appending the plurality of first packets together and arranging the plurality of redundant packets in free resources of the first signal so as to distribute a greater amount of free resources to packets imposing a larger influence degree on the transmission delay, with a second signal, generated by appending the plurality of second packets, in a separable manner.

10. The wireless communication apparatus according to claim 9, further comprising:
   an error determination section configured to determine an error packet included in the plurality of first packets,
   wherein the error-correction encoder arranges a redundant packet of the plurality of redundant packets in a free resource made available by non-transmission of the error packet in the first signal.

11. The wireless communication apparatus according to claim 10, wherein the error-correction encoder generates the redundant packet by reducing an encoding rate of a packet retransmitted a largest number of times of the plurality of first packets.

12. The wireless communication apparatus according to claim 10, wherein the error-correction encoder generates the plurality of redundant packets by subjecting respective packets in the plurality of first packets with the robust processing in accordance with respective influence degrees on a transmission delay of a system; and
   wherein the coder arranges the plurality of redundant packets in the free resource made available by non-transmission of the error packet in the first signal.

13. A wireless communication method for receiving a plurality of first packets from a first wireless communication apparatus and a plurality of second packets, which is collectively greater than the plurality of first packets in an amount of data, from a second wireless communication apparatus and transmitting a third signal, which has the same amount of data as the plurality of second packets collectively, to the first wireless communication apparatus and the second wireless communication apparatus, the method comprising:
   generating a plurality of redundant packets by reducing an encoding rate of an earliest received packet included in the plurality of first packets in accordance with respective influence degrees on a transmission delay; and
   generating the third signal by combining a first signal, which is generated by appending the plurality of first packets together and arranging the plurality of redundant packets in free resources of the first signal so as to distribute a greater amount of free resources to packets imposing a larger influence degree on the transmission delay, with a second signal, generated by appending the plurality of second packets, in a separable manner.

14. A wireless communication method for receiving a plurality of first packets from a first wireless communication apparatus and a plurality of second packets, which is collectively greater than the plurality of first packets in an amount of data, from a second wireless communication apparatus and transmitting a third signal, which has the same amount of data as the plurality of second packets collectively, to the first wireless communication apparatus and the second wireless communication apparatus, the method comprising:

identifying a packet having an oldest sequence order in the plurality of first packets;

generating a plurality of redundant packets by reducing an encoding rate of the packet having the oldest sequence order in the plurality of first packets in accordance with respective influence degrees on a transmission delay; and generating the third signal by combining a first signal, which is generated by appending the plurality of first packets together and arranging the plurality of redundant packets in free resources of the first signal so as to distribute a greater amount of free resources to packets imposing a larger influence degree on the transmission delay, with a second signal, generated by appending the plurality of second packets, in a separable manner.

15. A wireless communication method for receiving a plurality of first packets from a first wireless communication apparatus and a plurality of second packets, which is collectively greater than the plurality of first packets in an amount of data, from a second wireless communication apparatus and transmitting a third signal, which has the same amount of data as the plurality of second packets collectively, to the first wireless communication apparatus and the second wireless communication apparatus, the method comprising:

identifying a packet having an earliest redundancy version in the plurality of first packets;

generating a plurality of redundant packets by reducing an encoding rate of the packet having the earliest redundancy version in the plurality of first packets in accordance with respective influence degrees on a transmission delay of a system; and generating the third signal by combining a first signal, which is generated by appending the plurality of first packets together and arranging the plurality of redundant packets in free resources of the first signal so as to distribute a greater amount of free resources to packets imposing a larger influence degree on the transmission delay, with a second signal, generated by appending the plurality of second packets, in a separable manner.

\* \* \* \* \*